US008547567B2

(12) United States Patent
Manabe

(10) Patent No.: US 8,547,567 B2
(45) Date of Patent: Oct. 1, 2013

(54) IMAGE FORMATION APPARATUS CAPABLE OF REDUCING POWER CONSUMPTION, METHOD OF CONTROLLING IMAGE FORMATION APPARATUS, AND STORAGE MEDIUM

(75) Inventor: Kenji Manabe, Toyokawa (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 330 days.

(21) Appl. No.: 13/008,677

(22) Filed: Jan. 18, 2011

(65) Prior Publication Data

US 2011/0176160 A1 Jul. 21, 2011

(30) Foreign Application Priority Data

Jan. 18, 2010 (JP) .................................. 2010-008172

(51) Int. Cl.
*G06K 15/00* (2006.01)
(52) U.S. Cl.
USPC ........ 358/1.14; 358/1.13; 358/1.15; 713/300; 713/320; 713/324; 713/340
(58) Field of Classification Search
USPC .............. 358/1.14, 1.15, 1.13; 713/300, 320, 713/324, 340
See application file for complete search history.

(56) References Cited

U.S. PATENT DOCUMENTS

| 6,041,382 | A  | * | 3/2000 | Hirano | 710/316 |
| 7,800,772 | B2 | * | 9/2010 | Hamada | 358/1.15 |
| 2002/0196459 | A1 | * | 12/2002 | Kadowaki | 358/1.14 |
| 2007/0058190 | A1 |   | 3/2007 | Harumichi | |
| 2009/0051958 | A1 | * | 2/2009 | Ito | 358/1.14 |

FOREIGN PATENT DOCUMENTS

| JP | 2006-171297 A |   | 6/2006 |
| JP | 2007-81721 |   | 3/2007 |
| JP | 2007-267255 |   | 10/2007 |
| JP | 2007267255 A | * | 10/2007 |
| JP | 2009-116225 |   | 5/2009 |
| JP | 2009116225 A | * | 5/2009 |

OTHER PUBLICATIONS

Japanese Notice of Grounds of Rejection mailed Oct. 25, 2011, directed to corresponding Japanese Patent Application No. 2010-008172; 5 pages.

* cited by examiner

*Primary Examiner* — Jacky X Zheng
(74) *Attorney, Agent, or Firm* — Morrison & Foerster LLP

(57) ABSTRACT

An image formation apparatus having a plurality of function units includes: a first power management unit configured to perform power management; a plurality of components under the power management, provided in each function unit and each supplied with power to implement a corresponding function; and a second power management unit provided for each function unit. The second power management unit is configured to determine whether each component has an operational status satisfying a first predetermined condition, to stop supplying power to the component satisfying the first predetermined condition, if the component satisfies the first predetermined condition, to determine whether the plurality of components have a power supply status satisfying a second predetermined condition, and to change the first predetermined condition in content, if the second predetermined condition is satisfied. The first power management unit sets to a power saving mode the function unit of which components are all unsupplied with power.

24 Claims, 11 Drawing Sheets

FIG.3

| POWER MANAGEMENT UNIT | | COMPONENTS SUBJECT TO POWER MANAGEMENT |
|---|---|---|
| MAIN BODY CONTROLLER | ADF CONTROLLER | LEFT-ORIGINAL SENSOR |
| | | ADF SENSOR |
| | | SET-ORIGINAL SENSOR |
| | | SHEET PASSAGE SENSOR |
| | | DRIVE UNIT |
| | PANEL CONTROLLER | TOUCH PANEL DETECTION UNIT |
| | | NUMERAL KEY DETECTION UNIT |
| | | FUNCTION KEY DETECTION UNIT |
| | USB CONTROLLER | USB DEVICE ATTACHMENT DETECTION UNIT |
| | | USB DRIVE DEVICE |
| | ENGINE CONTROLLER | FUSER HEATER UNIT |
| | | DRIVE UNIT |
| | | FINISHER DISCHARGE SENSOR |
| | | FRONT DOOR SENSOR |
| | SCANNER CONTROLLER | CCD SENSOR |
| | | DRIVE UNIT |
| | | LAMP |

FIG.5

| COMPONENTS SUBJECT TO POWER MANAGEMENT | POWER STOPPING CONDITION | CHANGED VALUE |
|---|---|---|
| LEFT-ORIGINAL SENSOR | 7 TIMES OR LESS | 10 TIMES OR LESS |
| ADF SENSOR | 7 TIMES OR LESS | 10 TIMES OR LESS |
| SET-ORIGINAL SENSOR | 7 TIMES OR LESS | 10 TIMES OR LESS |
| SHEET PASSAGE SENSOR | 7 TIMES OR LESS | 10 TIMES OR LESS |
| DRIVE UNIT | 7 TIMES OR LESS | 10 TIMES OR LESS |
| TOUCH PANEL DETECTION UNIT | 7 TIMES OR LESS | 10 TIMES OR LESS |
| NUMERAL KEY DETECTION UNIT | 7 TIMES OR LESS | 10 TIMES OR LESS |
| FUNCTION KEY DETECTION UNIT | 7 TIMES OR LESS | 10 TIMES OR LESS |
| USB DEVICE ATTACHMENT DETECTION UNIT | 7 TIMES OR LESS | 10 TIMES OR LESS |
| USB DRIVE DEVICE | 7 TIMES OR LESS | 10 TIMES OR LESS |
| FUSER HEATER UNIT | 7 TIMES OR LESS | 10 TIMES OR LESS |
| DRIVE UNIT | 7 TIMES OR LESS | 10 TIMES OR LESS |
| FINISHER DISCHARGE SENSOR | 7 TIMES OR LESS | 10 TIMES OR LESS |
| FRONT DOOR SENSOR | 7 TIMES OR LESS | 10 TIMES OR LESS |
| CCD SENSOR | 7 TIMES OR LESS | 10 TIMES OR LESS |
| DRIVE UNIT | 7 TIMES OR LESS | 10 TIMES OR LESS |
| LAMP | 7 TIMES OR LESS | 10 TIMES OR LESS |

| FUNCTION BLOCKS | POWER STOPPING CONDITION CHANGING CONDITION |
|---|---|
| ADF | 2 |
| CONSOLE PANEL | 2 |
| USB I/F UNIT | 1 |
| PRINTER | 2 |
| SCANNER | 2 |

FIG.8

| POWER MANAGEMENT UNIT | COMPONENTS SUBJECT TO POWER MANAGEMENT | POWER CONSUMPTION (W) |
|---|---|---|
| MAIN BODY CONTROLLER | | 2.0 W |
| ADF CONTROLLER | | 2.0 W |
| | LEFT-ORIGINAL SENSOR | 0.10 W |
| | ADF SENSOR | 0.15 W |
| | SET-ORIGINAL SENSOR | 0.30 W |
| | SHEET PASSAGE SENSOR | 0.50 W |
| | DRIVE UNIT | 1.0 W |
| PANEL CONTROLLER | | 2.0 W |
| | TOUCH PANEL DETECTION UNIT | 1.0 W |
| | NUMERAL KEY DETECTION UNIT | 0.8 W |
| | FUNCTION KEY DETECTION UNIT | 0.5 W |
| USB CONTROLLER | | 2.0 W |
| | USB DEVICE ATTACHMENT DETECTION UNIT | 0.5 W |
| | USB DRIVE DEVICE | 0.5 W |
| ENGINE CONTROLLER | | 2.0 W |
| | FUSER HEATER UNIT | 5.0 W |
| | DRIVE UNIT | 1.0 W |
| | FINISHER DISCHARGE SENSOR | 1.0 W |
| | FRONT DOOR SENSOR | 0.2 W |
| SCANNER CONTROLLER | | 2.0 W |
| | CCD SENSOR | 0.3 W |
| | DRIVE UNIT | 1.0 W |
| | LAMP | 0.2 W |

FIG.9A

| COMPONENTS SUBJECT TO POWER MANAGEMENT | FREQUENCY OF USE (TIMES) |
|---|---|
| LEFT-ORIGINAL SENSOR | 1 |
| ADF SENSOR | 7 |
| SET-ORIGINAL SENSOR | 10 |
| SHEET PASSAGE SENSOR | 12 |
| DRIVE UNIT | 7 |
| TOUCH PANEL DETECTION UNIT | 15 |
| NUMERAL KEY DETECTION UNIT | 2 |
| FUNCTION KEY DETECTION UNIT | 13 |
| USB DEVICE ATTACHMENT DETECTION UNIT | 3 |
| USB DRIVE DEVICE | 7 |
| FUSER HEATER UNIT | 10 |
| DRIVE UNIT | 10 |
| FINISHER DISCHARGE SENSOR | 2 |
| FRONT DOOR SENSOR | 8 |
| CCD SENSOR | 7 |
| DRIVE UNIT | 10 |
| LAMP | 12 |

FIG.9B

| COMPONENTS SUBJECT TO POWER MANAGEMENT | FREQUENCY OF USE (TIMES) |
|---|---|
| LEFT-ORIGINAL SENSOR | — |
| ADF SENSOR | — |
| SET-ORIGINAL SENSOR | 9 |
| SHEET PASSAGE SENSOR | 10 |
| DRIVE UNIT | — |
| TOUCH PANEL DETECTION UNIT | 9 |
| NUMERAL KEY DETECTION UNIT | — |
| FUNCTION KEY DETECTION UNIT | 10 |
| USB DEVICE ATTACHMENT DETECTION UNIT | — |
| USB DRIVE DEVICE | — |
| FUSER HEATER UNIT | 9 |
| DRIVE UNIT | 9 |
| FINISHER DISCHARGE SENSOR | — |
| FRONT DOOR SENSOR | — |
| CCD SENSOR | — |
| DRIVE UNIT | 9 |
| LAMP | 10 |

FIG.10

| COMPONENTS SUBJECT TO POWER MANAGEMENT | POWER STOPPING CONDITION | CHANGED VALUE |
|---|---|---|
| LEFT-ORIGINAL SENSOR | 60 s | 30 s |
| ADF SENSOR | 60 s | 30 s |
| SET-ORIGINAL SENSOR | 60 s | 30 s |
| SHEET PASSAGE SENSOR | 60 s | 30 s |
| DRIVE UNIT | 60 s | 30 s |
| TOUCH PANEL DETECTION UNIT | 60 s | 30 s |
| NUMERAL KEY DETECTION UNIT | 60 s | 30 s |
| FUNCTION KEY DETECTION UNIT | 60 s | 30 s |
| USB DEVICE ATTACHMENT DETECTION UNIT | 60 s | 30 s |
| USB DRIVE DEVICE | 60 s | 30 s |
| FUSER HEATER UNIT | 60 s | 30 s |
| DRIVE UNIT | 60 s | 30 s |
| FINISHER DISCHARGE SENSOR | 60 s | 30 s |
| FRONT DOOR SENSOR | 60 s | 30 s |
| CCD SENSOR | 60 s | 30 s |
| DRIVE UNIT | 60 s | 30 s |
| LAMP | 60 s | 30 s |

FIG.11

| FUNCTION BLOCKS | POWER STOPPING CONDITION CHANGING CONDITION |
|---|---|
| ADF | EQUAL TO OR SMALLER THAN 0.9W |
| CONSOLE PANEL | EQUAL TO OR SMALLER THAN 1.5W |
| USB I/F UNIT | EQUAL TO OR SMALLER THAN 0.5W |
| PRINTER | EQUAL TO OR SMALLER THAN 3.0W |
| SCANNER | EQUAL TO OR SMALLER THAN 1.0W |

FIG.12A

| COMPONENTS SUBJECT TO POWER MANAGEMENT | HOW LONG COMPONENT IS UNUSED (s) |
|---|---|
| LEFT-ORIGINAL SENSOR | 90 |
| ADF SENSOR | 70 |
| SET-ORIGINAL SENSOR | 45 |
| SHEET PASSAGE SENSOR | 30 |
| DRIVE UNIT | 70 |
| TOUCH PANEL DETECTION UNIT | 50 |
| NUMERAL KEY DETECTION UNIT | 100 |
| FUNCTION KEY DETECTION UNIT | 40 |
| USB DEVICE ATTACHMENT DETECTION UNIT | 100 |
| USB DRIVE DEVICE | 100 |
| FUSER HEATER UNIT | 50 |
| DRIVE UNIT | 50 |
| FINISHER DISCHARGE SENSOR | 70 |
| FRONT DOOR SENSOR | 70 |
| CCD SENSOR | 70 |
| DRIVE UNIT | 40 |
| LAMP | 40 |

FIG.12B

| COMPONENTS SUBJECT TO POWER MANAGEMENT | HOW LONG COMPONENT IS UNUSED (s) |
|---|---|
| LEFT-ORIGINAL SENSOR | — |
| ADF SENSOR | — |
| SET-ORIGINAL SENSOR | 40 |
| SHEET PASSAGE SENSOR | 40 |
| DRIVE UNIT | — |
| TOUCH PANEL DETECTION UNIT | 50 |
| NUMERAL KEY DETECTION UNIT | — |
| FUNCTION KEY DETECTION UNIT | 50 |
| USB DEVICE ATTACHMENT DETECTION UNIT | — |
| USB DRIVE DEVICE | — |
| FUSER HEATER UNIT | 50 |
| DRIVE UNIT | 50 |
| FINISHER DISCHARGE SENSOR | — |
| FRONT DOOR SENSOR | — |
| CCD SENSOR | — |
| DRIVE UNIT | 50 |
| LAMP | 50 |

IMAGE FORMATION APPARATUS CAPABLE OF REDUCING POWER CONSUMPTION, METHOD OF CONTROLLING IMAGE FORMATION APPARATUS, AND STORAGE MEDIUM

This application is based on Japanese Patent Application No. 2010-008172 filed with the Japan Patent Office on Jan. 18, 2010, the entire content of which is hereby incorporated by reference.

BACKGROUND OF THE INVENTION

1. Field of the Invention

The present invention relates generally to an image formation apparatus and particularly to an image formation apparatus capable of reducing power consumption, a method of controlling the image formation apparatus, and a storage medium.

2. Description of the Related Art

In view of recent environmental concerns, there have been developed image formation apparatuses controlled to shift to a mode of operation in which the apparatus consumes reduced power when it is not used, i.e., a so called power saving mode.

For example, Japanese Laid-Open Patent Publication No. 2006-171297 describes a multifunctional image processor which counts an operation rate for each function and returns only a device that corresponds to a function having an operation rate equal to or larger than a predetermined value when the image processor returns from a power saving mode or a sleep state.

More specifically, the publication describes that a user enters an instruction to return the image processor from the sleep state, and at the time if the printer has a low operation rate, then, only the scanner is returned from the sleep state while the printer is not. This can prevent an unnecessary device from returning from the sleep state, and thus achieve reduced power consumption.

Furthermore, Japanese Laid-Open Patent Publication No. 2007-81721 describes facsimile multi function peripherals allowing a user to set whether to cut power supplied to an external interface unit in an energy saving mode or a power saving mode. When the user uses the facsimile multi function peripherals without using the external interface unit, the user can set cutting power supplied to the external interface unit and thus prevent an unnecessary device from consuming power.

However, these conventional techniques contemplate reduced power consumption by selecting a device to be returned from a power saving mode or by selecting a device to be prevented from receiving power in a power saving mode, and they do not contemplate reduced power consumption by adjusting a condition for shifting to a power saving mode. In other words, conventional image formation apparatuses are typically controlled to shift to a power saving mode when an instruction is not received for a predetermined period of time to operate an auto document feeder (ADF), a console panel, a scanner, a printer and other function blocks configuring the image formation apparatus, and there does not exist an image formation apparatus which changes a condition for shifting to a power saving mode depending on the apparatus's operating condition and thus more effectively achieves reduced power consumption.

SUMMARY OF THE INVENTION

The present invention has been made to address the above issue, and it contemplates an image formation apparatus capable of achieving further reduced power consumption, a method of controlling the image formation apparatus, and a storage medium.

The present invention in an aspect provides an image formation apparatus having a plurality of function units, including: a first power management unit configured to perform power management for supplying power for each of the function units; a plurality of components under the power management, provided in each function unit and each supplied with power to implement a corresponding function; and a second power management unit provided for each function unit and managing supplying power for each of the components. The second power management unit is configured to determine whether each component has an operational status satisfying a first predetermined condition. The second power management unit is configured to stop supplying power to the component satisfying the first predetermined condition, if the component satisfies the first predetermined condition. The second power management unit is configured to determine whether the plurality of components have a power supply status satisfying a second predetermined condition. The second power management unit is configured to change the first predetermined condition in content, if the second predetermined condition is satisfied. The first power management unit sets to a power saving mode the function unit of which components are all unsupplied with power.

Preferably, the first predetermined condition is whether how frequently the component is used is equal to or smaller than a predetermined value or not, and the second predetermined condition is whether how many of the components is/are supplied with power is equal to or smaller than a predetermined value or not.

In particular, when the second power management unit determines that the second predetermined condition is satisfied, the second power management unit changes the predetermined value of the first predetermined condition to a larger value.

Preferably, the first predetermined condition is whether how frequently the component is used is equal to or smaller than a predetermined value or not, and the second predetermined condition is whether that/those of the components which is/are supplied with power consumes/together consume a total of power equal to or smaller than a predetermined value or not.

Preferably, the first predetermined condition is whether how long period of time the component has been unused for since the component was immediately previously used is equal to or larger than a predetermined value or not, and the second predetermined condition is whether how many of the components is/are supplied with power is equal to or smaller than a predetermined value or not.

In particular, when the second power management unit determines that the second predetermined condition is satisfied, the second power management unit changes the period of time of the first predetermined condition to a smaller value.

Preferably, the first predetermined condition is whether how long period of time the component has been unused for since the component was immediately previously used is equal to or larger than a predetermined value or not, and the second predetermined condition is whether that/those of the components which is/are supplied with power consumes/together consume a total of power equal to or smaller than a predetermined value or not.

The present invention in an aspect provides a method for controlling an image formation apparatus having a plurality of function units and provided with a plurality of components under power management provided in each function unit and each supplied with power to implement a corresponding function, including the steps of: managing supplying power for each of the function units; and managing supplying power for each of the components for each function unit. The step of managing supplying power for each of the components for each function unit includes the steps of: determining whether each component has an operational status satisfying a first predetermined condition; if in the step of determining whether each component has the operational status satisfying the first predetermined condition it is determined that the component satisfies the first predetermined condition, then stopping supplying power to the component satisfying the first predetermined condition; determining whether the plurality of components have a power supply status satisfying a second predetermined condition; and if in the step of determining whether the plurality of components have the power supply status satisfying the second predetermined condition it is determined that the second predetermined condition is satisfied, then changing the first predetermined condition in content. The step of managing supplying power for each of the function units includes the step of setting to a power saving mode the function unit of which components are all unsupplied with power.

Preferably, the first predetermined condition is whether how frequently the component is used is equal to or smaller than a predetermined value or not, and the second predetermined condition is whether how many of the components is/are supplied with power is equal to or smaller than a predetermined value or not.

In particular, if it is determined that the second predetermined condition is satisfied, then, in the step of changing, the predetermined value of the first predetermined condition is changed to a larger value.

Preferably, the first predetermined condition is whether how frequently the component is used is equal to or smaller than a predetermined value or not, and the second predetermined condition is whether that/those of the components which is/are supplied with power consumes/together consume a total of power equal to or smaller than a predetermined value or not.

Preferably, the first predetermined condition is whether how long period of time the component has been unused for since the component was immediately previously used is equal to or larger than a predetermined value or not, and the second predetermined condition is whether how many of the components is/are supplied with power is equal to or smaller than a predetermined value or not.

In particular, if it is determined that the second predetermined condition is satisfied, then, in the step of changing, the period of time of the first predetermined condition is changed to a smaller value.

Preferably, the first predetermined condition is whether how long period of time the component has been unused for since the component was immediately previously used is equal to or larger than a predetermined value or not, and the second predetermined condition is whether that/those of the components which is/are supplied with power consumes/together consume a total of power equal to or smaller than a predetermined value or not.

The present invention in an aspect provides a storage medium having stored therein a control program readable by a computer of an image formation apparatus having a plurality of function units, and provided with a plurality of components under power management provided in each function unit and each supplied with power to implement a corresponding function, the control program causing the computer to perform a process including the steps of: managing supplying power for each of the function units; and managing supplying power for each of the components for each function unit. The step of managing supplying power for each of the components for each function unit includes the steps of: determining whether each component has an operational status satisfying a first predetermined condition; if in the step of determining whether each component has the operational status satisfying the first predetermined condition it is determined that the component satisfies the first predetermined condition, then stopping supplying power to the component satisfying the first predetermined condition; determining whether the plurality of components have a power supply status satisfying a second predetermined condition; and if in the step of determining whether the plurality of components have the power supply status satisfying the second predetermined condition it is determined that the second predetermined condition is satisfied, then changing the first predetermined condition in content. The step of managing supplying power for each of the function units includes the step of setting to a power saving mode the function unit of which components are all unsupplied with power.

Preferably, the first predetermined condition is whether how frequently the component is used is equal to or smaller than a predetermined value or not, and the second predetermined condition is whether how many of the components is/are supplied with power is equal to or smaller than a predetermined value or not.

In particular, if it is determined that the second predetermined condition is satisfied, then, in the step of changing, the predetermined value of the first predetermined condition is changed to a larger value.

Preferably, the first predetermined condition is whether how frequently the component is used is equal to or smaller than a predetermined value or not, and the second predetermined condition is whether that/those of the components which is/are supplied with power consumes/together consume a total of power equal to or smaller than a predetermined value or not.

Preferably, the first predetermined condition is whether how long period of time the component has been unused for since the component was immediately previously used is equal to or larger than a predetermined value or not, and the second predetermined condition is whether how many of the components is/are supplied with power is equal to or smaller than a predetermined value or not.

In particular, if it is determined that the second predetermined condition is satisfied, then, in the step of changing, the period of time of the first predetermined condition is changed to a smaller value.

Preferably, the first predetermined condition is whether how long period of time the component has been unused for since the component was immediately previously used is equal to or larger than a predetermined value or not, and the second predetermined condition is whether that/those of the components which is/are supplied with power consumes/together consume a total of power equal to or smaller than a predetermined value or not.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 illustrates a relationship in which power management is controlled in the MFP.

FIG. 5 is a diagram for illustrating a power stopping condition.

FIG. 7 is a diagram for specifically illustrating a process performed by a general control unit to cause a function block to enter a power saving mode.

FIG. 8 is a diagram for illustrating the (average) power consumptions of the MFP's power management units and those of their components subject to power management.

FIGS. 9A and 9B illustrate how frequently the MFP's components subject to power management are used.

FIG. 10 is a diagram for illustrating a power stopping condition according to a first exemplary variation of the embodiment of the present invention.

FIG. 11 is a diagram for illustrating a condition for changing a power stopping condition according to the first exemplary variation of the embodiment of the present invention.

FIGS. 12A and 12B illustrate how long the MFP's components subject to power management are unused.

DESCRIPTION OF THE PREFERRED EMBODIMENTS

General Configuration of MFP

Figure 1:
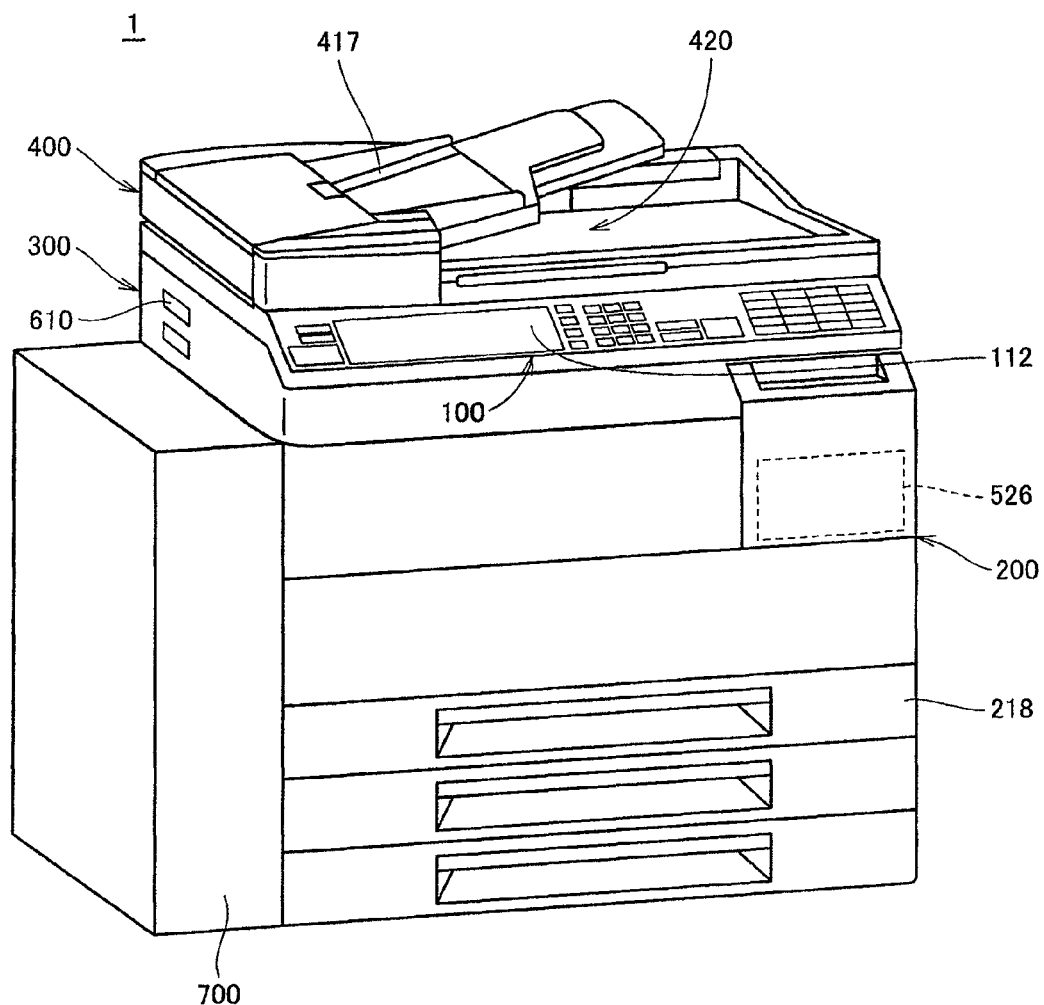
FIG. 1 shows an appearance of an MFP implementing an image formation apparatus according to an embodiment of the present invention.

With reference to FIG. 1, the present invention in an embodiment provides an image formation apparatus implemented as multi function peripheral (MFP) 1 having an appearance, as will be described hereinafter.

With reference to FIG. 1, the present invention in the embodiment provides MFP 1, which is a digital multifunction peripheral having a copy function, a scanner function, and the like.

MFP 1 includes a console panel 100 having a plurality of hard keys and a console display 112. The hard keys include numeral keys operated to input numerals and the like and a function key operated to set a function. The function key includes a key operated to return MFP 1 from a power saving mode. Console display 112 includes a touch panel and a liquid crystal display (LCD). The touch panel is operated by a user to input a variety of instructions, and characters, numerals and other data therethrough. The LCD displays an instruction menu for the user, information of an image obtained through a scanner 300 as will be described later, and the like.

Furthermore, MFP 1 includes scanner 300 optically reading an original to obtain image data and a printer 200 printing an image, based on the image data, on a recording sheet.

Furthermore, an auto document feeder (ADF) 400 is provided on an upper surface of the main body of MFP 1. ADF 400 feeds an original(s) that is/are placed on an original setting tray 417, one at a time to an image reading position of scanner 300 automatically, and after an original has its image read, ADF 400 discharges the original to an original discharge tray 420. Note that ADF 400 can be opened and closed relative to scanner 300 and when ADF 400 is opened the user can manually place an original on a platen glass of scanner 300.

Furthermore, MFP 1 is provided in its main body at a lower portion with a sheet feeding unit 218 supplying printer 200 with recording sheets, and MFP 1 is provided in its main body at a left end with a finisher 700 receiving a discharged recording sheet bearing an image printed by printer 200.

Finisher 700 subjects the recording sheet bearing the image printed by printer 200 to punching, stapling and/or a similar post process. Furthermore, MFP 1 has a side surface provided with a connector 610 used to connect a universal serial bus (USB) memory or a similar USB device.

Furthermore, MFP 1 is provided in its main body with a data storage unit 526 having stored therein a control program used at each unit for controlling the main body, image data, and other data required to operate MFP 1.

Figure 2:
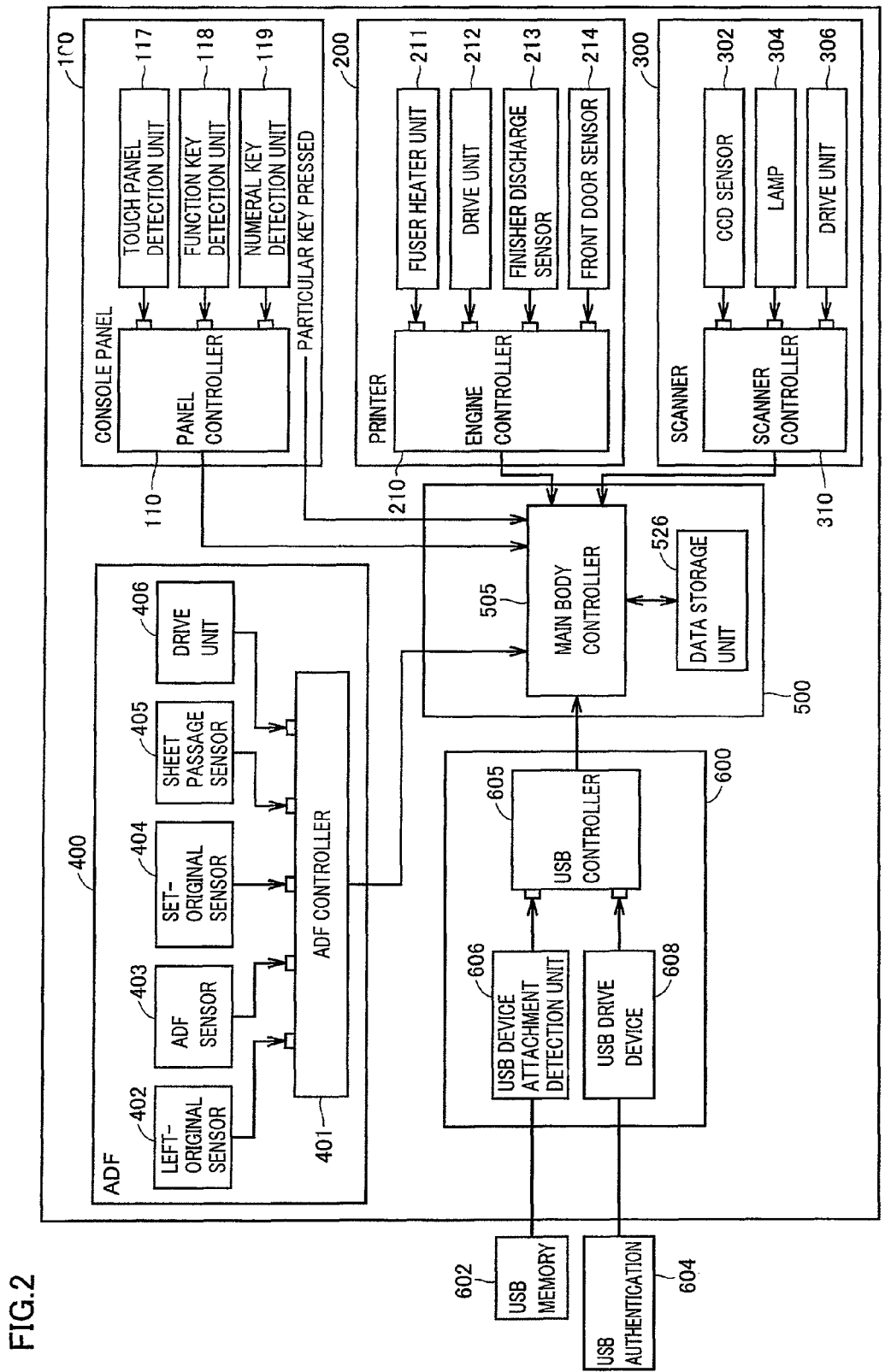
FIG. 2 is a functional block diagram of the MFP according to the embodiment of the present invention.

Reference will now be made to FIG. 2 to describe a function block diagram of MFP 1 according to the embodiment of the present invention.

With reference to FIG. 2, the present invention in the embodiment provides MFP 1 generally including the following five function blocks.

More specifically, the function blocks are ADF 400 feeding an original placed on original setting tray 417; scanner 300 scanning the original to obtain image data (electronic data); printer 200 operative to perform a printing process; console panel 100 receiving an instruction input for an operation; and a USB interface unit (USB I/F unit) 600 controlling the USB device.

MFP 1 further includes a general control unit 500 controlling the five function blocks. General control unit 500 controls the five function blocks to generally control the operation of MFP 1 and also manage the power of MFP 1.

General control unit 500 includes a main body controller 505 and data storage unit 526.

Main body controller 505 is for example a central processing unit (CPU) or the like for the sake of illustration.

Data storage unit 526 includes a read only memory (ROM) having the control program and/or the like stored therein, a random access memory (RAM) used as a working area for performing a control process in the CPU, and a hard disc drive (HDD) storing a variety of information and the like registered in MFP 1. Note that in the following description the present invention in the embodiment provides power management performed in accordance with a program stored by way of example in data storage unit 526 at the ROM for the sake of illustration and read to implement the function of interest for the sake of illustration. Furthermore, although not shown, general control unit 500 is provided with a timer (or a clock).

Scanner 300 includes a lamp 304 exposing an original to light, a charge coupled device (CCD) sensor 302 reading light reflected by the original, a drive unit 306 for driving an optical unit for imaging on CCD sensor 302 the light reflected by the original, and a scanner controller 310 generally controlling the operation of scanner 300 and also managing the power of scanner 300. Scanner controller 310 is for example a CPU.

Printer 200 includes a drive unit 212 for driving a transfer roller, a fixer roller and the like used to form an image on a recording sheet; a fuser heater unit 211 for heating the fixer roller and the like located in a fuser unit; a finisher discharge sensor 213 sensing a recording sheet discharged to finisher 700; a front door sensor 214 sensing whether MFP 1 has the main body's front door open; and an engine controller 210 generally controlling the operation of printer 200 and also managing the power of printer 200. Engine controller 210 is for example a CPU.

Console panel 100 includes a touch panel detection unit 117 detecting an operation provided on the touch panel of console display 112; a numeral key detection unit 119 detecting an operation provided via the numeral keys of console panel 100; a function key detection unit 118 detecting an operation provided via the function key of console panel 100;

and a panel controller 110 generally controlling the operation of console panel 100 and also managing the power of console panel 100. Panel controller 110 is for example a CPU.

ADF 400 includes a left-original sensor 402 sensing an original left on original discharge tray 420; an ADF sensor 403 sensing whether ADF 400 is opened/closed; a set-original sensor 404 sensing an original placed on original setting tray 417; a sheet passage sensor 405 sensing an original passing along a carrier path internal to ADF 400; a drive unit 406 for driving a carriage roller incorporated in ADF 400; and an ADF controller 401 generally controlling the operation of ADF 400 and also managing the power of ADF 400. ADF controller 401 is for example a CPU.

USB I/F unit 600 includes a USB device attachment detection unit 606 detecting that the USB device has been attached to connector 610; a USB drive device 608 controlling an access to the USB device; and a USB controller 605 generally controlling the operation of USB I/F unit 600 and also managing the power of USB I/F unit 600. USB controller 605 is for example a CPU.

Note that FIG. 2 shows by way of example a USB memory 602 and a USB authentication device 604 attached to connector 610.

In the present embodiment MFP 1 includes a copy function and a scanner function, and in addition a facsimile function or a mail function. More specifically, MFP 1 can transmit image data that is read via scanner 300 to another device by the facsimile function or the mail function.

Reference will now be made to FIG. 3 to describe a relationship in which power management is controlled in MFP 1.

With reference to FIG. 3, main body controller 505 manages the controllers provided for the function blocks, respectively.

More specifically, main body controller 505 manages ADF controller 401, panel controller 110, USB controller 605, engine controller 210, and scanner controller 310.

In the ADF 400 function block, ADF controller 401 manages power supplied to left-original sensor 402, ADF sensor 403, set-original sensor 404, sheet passage sensor 405, and drive unit 406. More specifically, ADF controller 401 controls whether to supply power to left-original sensor 402, ADF sensor 403, set-original sensor 404, sheet passage sensor 405, and drive unit 406. Note that hereinafter in a function block a side that manages power (herein, ADF controller 401) will be referred to as a power management unit, and a side having its power controlled (herein, left-original sensor 402, ADF sensor 403, set-original sensor 404, sheet passage sensor 405, and drive unit 406) will be referred to as a component subject to power management.

In the console panel 100 function block, a power management unit, i.e., panel controller 110 manages power supplied to components subject to power management, i.e., touch panel detection unit 117, function key detection unit 118, and numeral key detection unit 119.

In the USB I/F unit 600 function block, a power management unit, i.e., USB controller 605 manages power supplied to components subject to power management, i.e., USB device attachment detection unit 606 and USB drive device 608.

In the printer 200 function block, a power management unit, i.e., engine controller 210 manages power supplied to components subject to power management, i.e., fuser heater unit 211, drive unit 212, finisher discharge sensor 213, and front door sensor 214.

In the scanner 300 function block, a power management unit, i.e., scanner controller 310 manages power supplied to components subject to power management, i.e., CCD sensor 302, lamp 304, and drive unit 306.

Figure 4:
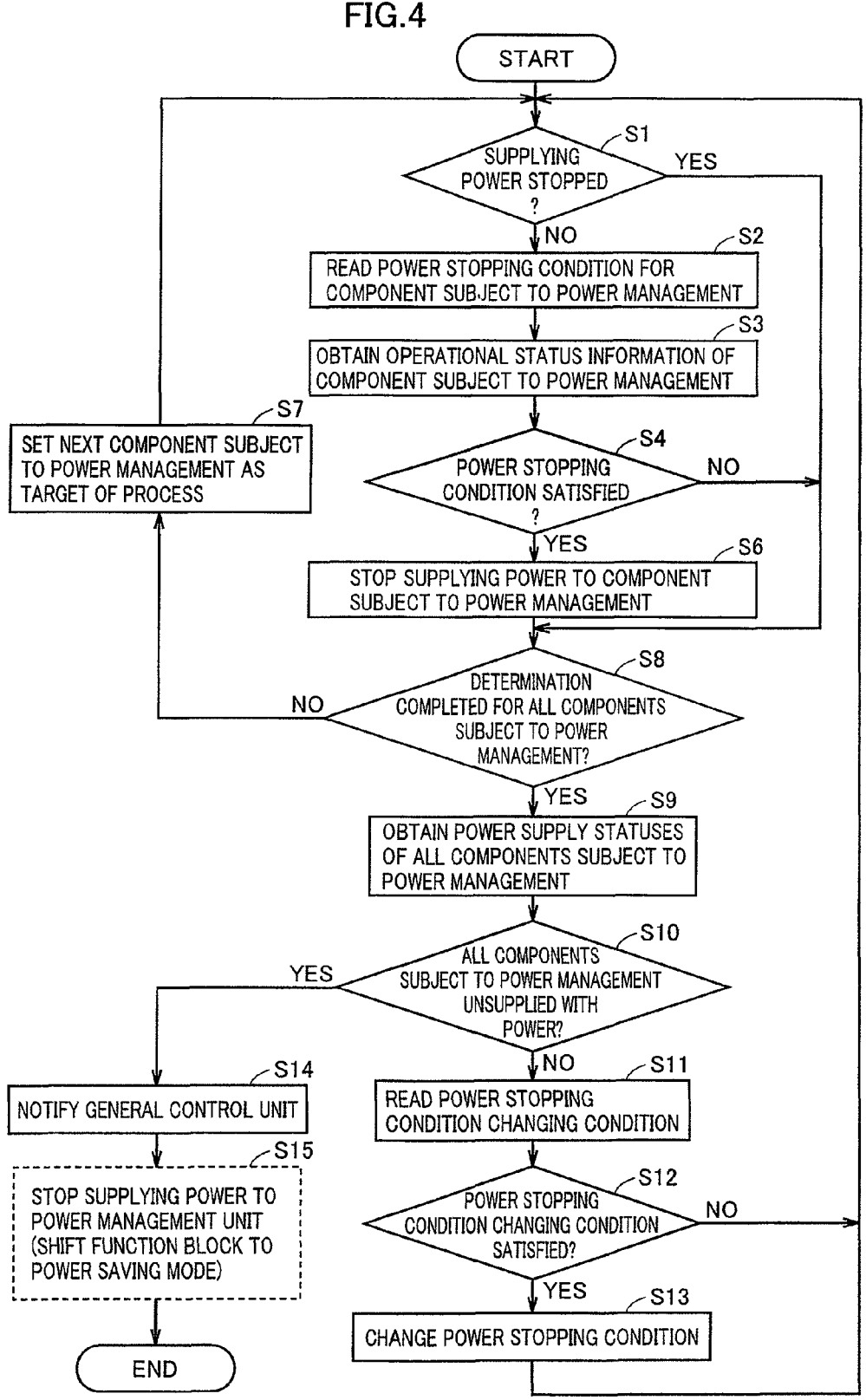
FIG. 4 is a flowchart for illustrating a process performed by a power management unit to manage power supplied to a component subject to power management.

FIG. 4 is a flowchart for illustrating a process performed by a power management unit to manage power supplied to a component subject to power management.

With reference to FIG. 4, the power management unit stops supplying power to a component subject to power management when the component subject to power management satisfies a condition for stopping supplying power (hereinafter also referred to as a "power stopping condition"), and furthermore the power management unit performs a process for changing the power stopping condition when its function block satisfies a condition for changing the power stopping condition. Note that the power management unit reads the program stored in data storage unit 526 at the ROM and in accordance therewith performs a process indicated in the FIG. 4 flowchart.

With reference to FIG. 4, the power management unit performs a process for managing power supplied to a component subject to power management, as will be described more specifically hereinafter.

The power management unit sets as a target of the process any one of the components subject to power management included in its function block, and the power management unit determines whether supplying power to the target component subject to power management has been stopped (step S1). If not (NO at step S1), the power management unit reads a power stopping condition stored in data storage unit 526 that corresponds to the target component subjected to power management (step S2). A power stopping condition is a condition associated with a component subject to power management and used in determining whether to stop power supplied to the component subject to power management.

With reference to FIG. 5, a power stopping condition will now be described.

FIG. 5 shows a table describing a power stopping condition.

The power stopping condition table is stored in data storage unit 526. The power stopping condition table describes power stopping conditions corresponding to all of the components, respectively, subject to power management included in MFP 1. In the present embodiment, a power stopping condition is how many times (or how frequently) a component subject to power management is used within a predetermined period of time.

While FIG. 5 shows by way of example that a power stopping condition having an identical value (i.e., 7 times) is set for all of the components subject to power management, the power stopping condition table may describe any (different) condition for each component subject to power management. Note that the power stopping condition table also indicates a changed value of the power stopping condition, which will be described later.

Again with reference to FIG. 4, the power management unit obtains information of the operational status of the target component subjected to power management (step S3). In the present embodiment, the information of the operational status of a component subjected to power management indicates how frequently the component subject to power management is used within a predetermined period of time.

The power management unit can obtain how frequently a component subject to power management is used, for example in the following method.

Whenever any component subject to power management operates (or is used), the power management unit associates information identifying the used component subject to power management with the date and time at which the component subject to power management is used, to create history-of-use information, and the power management unit stores the information to data storage unit 526. When the power management unit obtains at step S3 the information of the operational status of the component subject to power management, the power management unit refers to the history-of-use information stored in data storage unit 526 that has any dates and times of use that precede the current time point and also fall within a predetermined period of time as counted from the current time point, and the power management unit thus obtains cumulatively how many times each component subject to power management is used to obtain how frequently it is used within the predetermined period of time.

Then, the power management unit proceeds to step S4 to determine whether the target component subject to power management has an operational status satisfying its power stopping condition. More specifically, when the operational status of the target component subjected to power management, i.e., how frequently the target component subjected to power management is used, as obtained in step S3, is equal to or smaller than the power stopping condition read in step S2, the power management unit determines that a condition for stopping supplying power is satisfied. In other words, the power management unit determines that supplying power to the target component subject to power management should be stopped when the target component subject to power management is infrequently used.

In step S4 if the power management unit determines that the power stopping condition is satisfied (YES at step S4), the power management unit stops supplying power to the target component subjected to power management (step S6). The power management unit then proceeds to step S8.

If in step S4 the power management unit determines that the power stopping condition is not satisfied (NO at step S4), the power management unit does not stop supplying power to the target component subjected to power management (i.e., continues supplying power thereto) and proceeds to step S8.

If in step S1 the power management unit determines that supplying power to the target component subjected to power management has been stopped (YES at step S1), the power management unit does not perform steps S2-S6 and instead proceeds to step S8.

Then the power management unit determines whether it has determined for all of the components subject to power management included in the function block whether they satisfy their power stopping conditions (step S8).

If in step S8 the power management unit determines otherwise (NO at step S8), the power management unit sets a next component subject to power management as a next target of the process (step S7) and returns to step S1.

The power management unit repeats steps S1-S8 until the power management unit has determined for all of the components subject to power management whether they satisfy their power stopping conditions.

If the power management unit determines in step S8 that it has determined for all of the components subject to power management whether they satisfy their power stopping conditions (YES at step S8), the power management unit proceeds to step S9.

In step S9, the power management unit obtains information of a power supply status of each of all of the components subject to power management included in the function block. A power supply status indicates whether a component subject to power management included in a function block is currently supplied with power or not. In other words, it indicates how many of the components subject to power management included in the function block is/are supplied with power.

Subsequently in step S10 the power management unit determines whether none of the components subject to power management included in the function block is supplied with power.

If so (YES at step S10), the power management unit notifies general control unit 500 accordingly (step S14). In response, general control unit 500 stops supplying power to the power management unit having issued the step S14 notification. In other words, general control unit 500 shifts the function block to the power saving mode (step S15) and the process of the flowchart ends (END).

Note that in the FIG. 4 flowchart, step S15 is indicated by a dotted line because the step is not performed by the power management unit but by general control unit 500 toward the power management unit.

If in step S10 the function block does not have its components subject to power management all unsupplied with power, i.e., the function block still has a component subject to power management supplied with power (NO at step S10), the power management unit reads a power stopping condition changing condition (step S11), which is a condition associated with the function block and used in determining whether to change a power stopping condition. The power stopping condition changing condition is stored in data storage unit 526, as will be described later.

Figure 6:
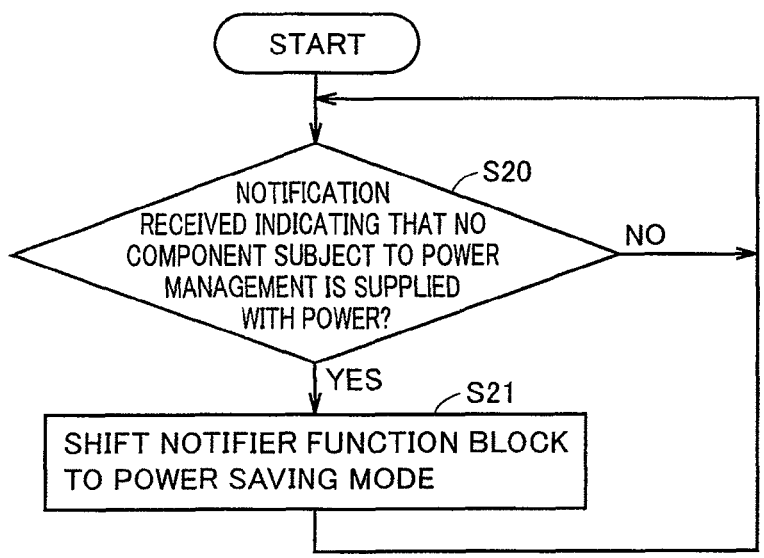
FIG. 6 is a diagram for illustrating a condition for changing a power stopping condition.

With reference to FIG. 6, a power stopping condition changing condition will now be described.

FIG. 6 shows a table indicating power stopping condition changing conditions. The power stopping condition changing condition table is stored in data storage unit 526.

The power stopping condition changing condition table describes power stopping condition changing conditions corresponding to all of the function blocks, respectively, included in MFP 1. In the present embodiment, how many of the components subject to power management included in each function block are still supplied with power is indicated as a power stopping condition changing condition by way of example.

Herein the table describes that a power stopping condition changing condition is exemplified by an identical value (i.e., 2) for each block other than the USB I/F unit. The table indicates one (1) for the function block of the USB I/F unit. However, any different power stopping condition changing condition may be set for each function block.

Again with reference to FIG. 4, the power management unit determines in step S12 whether the function block has a power supply status satisfying the power stopping condition changing condition. More specifically, the power management unit determines whether how many of the components subject to power management is/are still supplied with power is equal to or smaller than the power stopping condition changing condition or not. If so (YES at step S12), the power management unit changes the power stopping condition (step S13).

The power management unit in step S13 changes the power stopping condition based on the FIG. 5 power stopping condition table.

The FIG. 5 power stopping condition table describes a changed value of a power stopping condition for each component subject to power management. In step S13, the power management unit changes a value of a power stopping condition to a changed value indicated in the power stopping condition table.

As shown in FIG. 5, a changed value of a power stopping condition is larger than that previously set. In other words, in step S13, a power stopping condition is changed so that subsequently in step S4 it is more likely that a decision is made that the power stopping condition is satisfied, i.e., it is more likely that supplying power is stopped.

In contrast, if in step S12 the power management unit determines that the function block does not have a power supply status satisfying the power stopping condition changing condition (NO at step S12) the power management unit does not change the power stopping condition and returns to step S1.

Then until the power management unit determines in step S10 that the function block has its components subject to power management all unsupplied with power (YES at step S10), the power management unit repeats steps S1-S13. Once the power management unit has determined in step S10 that the function block has its components subject to power management all unsupplied with power (YES at step S10), then, as has been described previously, general control unit 500 is notified accordingly (step S14) and shifts that function block to the power saving mode (step S15), and the process represented in the flowchart thus ends (END).

As has been described previously, in the FIG. 4 flowchart, the power management unit performs a process to stop supplying power to a component subject to power management included in a function block that is infrequently used, and when the number of components subject to power management that are still supplied with power is reduced, the power management unit performs a process to change a power stopping condition to promote stopping supplying power to the component(s) subject to power management still supplied with power.

With reference to FIG. 7, general control unit 500 performs a process to shift a function block to the power saving mode, as will more specifically be described hereinafter.

General control unit 500 reads a program stored in the ROM of data storage unit 526 and in accordance therewith performs a process as shown in the FIG. 7 flowchart.

With reference to FIG. 7, general control unit 500 awaits until it is notified by a power management unit that the power management unit has stopped supplying power to all of the components subject to power management included in the corresponding function block (step S20). When general control unit 500 determines that it has been notified by the power management unit that the power management unit has stopped supplying power to all of the components subject to power management included in the function block (YES at step S20) the general control unit 500 shifts that function block to the power saving mode (step S21). The power saving mode as referred to herein means a state in which only a minimum power required to perform a process to return from the power saving mode to a normal mode allowing a function block to perform a process is supplied to the function block and supplying any other power is stopped. In other words, in the power saving mode, a function block is not supplied with power and thus cannot perform a process.

General control unit 500 thus performs a process to shift to the power saving mode a function block for which general control unit 500 is notified that none of the components subject to power management included in the function block is supplied with power.

Hereinafter, when the function block of interest is ADF 400, the FIG. 4 process is performed, as will be described more specifically hereinafter.

Herein, ADF 400 has its components subject to power management all supplied with power for the sake of illustration. Note that MFP 1's power management units and components subject to power management each consume power (on average) as indicated in FIG. 8 for the sake of illustration.

Accordingly, at this point in time, ADF 400 as a whole consumes a power of 2.0 W at ADF controller 401, a power of 0.10 W at left-original sensor 402, a power of 0.15 W at ADF sensor 403, a power of 0.30 W at set-original sensor 404, a power of 0.50 W at sheet passage sensor 405, and a power of 1.0 W at drive unit 406 for a total of 4.05 W.

With reference to FIG. 4, ADF controller 401 sets left-original sensor 402 as a first target component subjected to power management, and determines that supplying power thereto is not stopped (NO at step S1). Then, ADF controller 401 refers to the power stopping condition table (FIG. 5) stored in data storage unit 526 to read a power stopping condition corresponding to left-original sensor 402 (i.e., 7 times) (step S2).

Then ADF controller 401 obtains how frequently left-original sensor 402 is used. As has been described previously, ADF controller 401 obtains how frequently left-original sensor 402 is used from the history-of-use information of left-original sensor 402 stored in data storage unit 526 (step S3). Herein, how frequently the components subject to power management included in ADF 400 are used is shown in FIG. 9A for the sake of illustration.

Again with reference to FIG. 4, in step S4, ADF controller 401 compares how frequently left-original sensor 402 is used (i.e., once, see FIG. 9A) with the power stopping condition for left-original sensor 402 (i.e., 7 times, see FIG. 5). The former (i.e., once) is smaller than the latter (i.e., 7 times), and ADF controller 401 determines that left-original sensor 402 satisfies the power stopping condition (YES at step S4). Accordingly, ADF controller 401 stops supplying power to left-original sensor 402 (step S6).

Then, at step S8, ADF controller 401 determines that it has not completed its determination for all of the components subject to power management (NO at step S8), and ADF controller 401 sets ADF sensor 403 as a target of the process (step S7) and returns to step S1.

ADF controller 401 also subjects ADF sensor 403, set-original sensor 404, sheet passage sensor 405, and drive unit 406 to steps S1-S8, similarly as it has done for left-original sensor 402.

While herein no description is provided in line with the flowchart, each component subject to power management is subjected by ADF controller 401 to the following process:

With reference to FIG. 5 and FIG. 9A, how many times ADF sensor 403 is used (i.e., 7 times) is equal to or smaller than its power stopping condition (i.e., 7 times), and accordingly, supplying power thereto is stopped. How many times set-original sensor 404 is used (i.e., 10 times) is larger than its power stopping condition (i.e., 7 times), and accordingly, supplying power thereto is continued (or not stopped). How many times sheet passage sensor 405 is used (i.e., 12 times) is larger than its power stopping condition (i.e., 7 times), and accordingly, supplying power thereto is continued (or not stopped). How many times drive unit 406 is used (i.e., 7 times) is equal to or smaller than its power stopping condition (i.e., 7 times), and accordingly, supplying power thereto is stopped.

Thus, as described above, supplying power to left-original sensor 402, ADF sensor 403, and drive unit 406 is stopped. Thus, at this point in time, ADF 400 as a whole achieves a power consumption reduced from its initial power consumption of 4.05 W by 1.25 W to 2.80 W.

Again with reference to FIG. 4, ADF controller 401 determines that it has completed its determination for all of the components subject to power management (YES at step S8), and ADF controller 401 obtains the power supply statuses of the components subject to power management included in ADF 400 (step S9).

ADF controller 401 determines that the function block does not have its components subject to power management all unsupplied with power, (NO at step S10), and ADF controller 401 refers to the power stopping condition changing condition table (FIG. 6) stored in data storage unit 526 to read a power stopping condition changing condition corresponding to ADF 400 (step S11).

Then at step S12 the number of components subject to power management currently supplied with power (i.e., the two components of set-original sensor 404 and sheet passage sensor 405) is equal to or smaller than the power stopping condition changing condition (i.e., 2) and ADF controller 401 determines that the power stopping condition changing condition is satisfied (YES at step S12).

Then at step S13 ADF controller 401 refers to the power stopping condition table (FIG. 5) stored in data storage unit 526 to change the power stopping condition's value.

More specifically, ADF controller 401 changes the power stopping condition for the components subject to power management included in ADF 400 from 7 times to 10 times. ADF controller 401 subsequently returns to step S1.

At this point in time, left-original sensor 402, ADF sensor 403, and drive unit 406 are not supplied with power, and accordingly, only set-original sensor 404 and sheet passage sensor 405 are subjected to steps S2-S6.

How frequently the components subject to power management included in ADF 400 have been used, as counted at this point in time, is indicated as shown in FIG. 9B for the sake of illustration. Time has elapsed since how frequently the components subject to power management had been used was previously obtained, and accordingly, how frequently the components subject to power management are used has varied from FIG. 9A to FIG. 9B.

Note that FIG. 9B indicates "-", which means that supplying power to a component subject to power management is stopped based on how frequently the component subject to power management is used, as shown in FIG. 9A.

How many times set-original sensor 404 is used (i.e., 9 times) is equal to or smaller than its power stopping condition (i.e., 10 times), and accordingly, ADF controller 401 stops supplying power to set-original sensor 404 (step S6). Furthermore, how many times sheet passage sensor 405 is used (i.e., 10 times) is equal to or smaller than its power stopping condition (i.e., 10 times), and accordingly, ADF controller 401 stops supplying power to sheet passage sensor 405 (step S6). At this point in time, set-original sensor 404's power consumption (0.30 W) and sheet passage sensor 405's power consumption (0.5 W) are reduced and accordingly, ADF 400's power consumption will only be ADF controller 401's power consumption (2.0 W).

Then ADF controller 401 determines in step S10 that the function block has its components subject to power management all unsupplied with power (YES at step S10), and ADF controller 401 notifies general control unit 500 accordingly (step S14). In response, general control unit 500 shifts ADF 400 to the power saving mode. ADF 400, having been shifted to the power saving mode, is supplied with only a minimum power required to perform a process to return from the power saving mode to the normal mode. In the power saving mode, ADF 400 is supplied with power having a sufficiently smaller value than a power normally consumed by ADF controller 401 (i.e., 2.0 W).

While the above description has been made with ADF 400 serving as one example of a function block, the other function blocks, i.e., scanner 300, printer 200, console panel 100, and USB I/F unit 600, are also subjected to a similar process. More specifically, the power management unit included in each function block performs the FIG. 4 process to manage supplying power to components subject to power management.

Thus in accordance with the present invention MFP 1 depends on a power supply status of a component subject to power management to change a condition for determining whether to stop supplying power to the component subject to power management, i.e., a power stopping condition. More specifically, when a reduced number of components subject to power management are supplied with power, MFP 1 changes the power stopping condition to promote determination to stop supplying power.

In an MFP or a similar image formation apparatus when a function block does not have a large number of components subject to power management supplied with power (i.e., has a large number of components subject to power management less frequently used), it is often the case that the function block also has the remaining component(s) subject to power management supplied with power less likely to be used.

However, conventional image formation apparatuses have fixed power stopping conditions for components subject to power management, and cannot shift to the power saving mode a function block having a large number of less frequently used components subject to power management, and thus have a limit in effectively reducing power consumption. Furthermore, if supplying power is stopped for a less frequently used component subject to power management individually, supplying power to the power management unit (or controller) cannot be stopped without shifting the function block entirely to the power saving mode, and there is a limit in effectively reducing power consumption.

Accordingly the present invention in an embodiment provides MFP 1 that can depend on a power supply status of a component subject to power management to change a power stopping condition to stop power supplied to the component subject to power management earlier than conventional while maintaining the user's convenience. Consequently, it also allows a function block to be shifted to the power saving mode early and can reduce a controller's power consumption. This can reduce power consumption more effectively than conventional.

Note that while in the above description an exemplary power stopping condition table is indicated as shown in FIG. 5 and an exemplary power stopping condition changing condition table is indicated as shown in FIG. 6, the power stopping condition changing condition is not limited to these values, and may be set at appropriate values through an experiment or empirically to efficiently save energy. Furthermore, these values can also be set by an administrator of MFP 1, a general user thereof or the like via the console panel.

Furthermore while in the above description the FIG. 4 process is performed by a power management unit or a controller in a function block and the power management unit notifies general control unit 500 (i.e., the FIG. 4 step S14, and the FIG. 7 step S20) which in turn shifts the function block to the power saving mode (i.e., the FIG. 4 step S15, and the FIG. 7 step S21), these steps may all be performed by general control unit 500. In other words, the FIGS. 4 and 7 process may be performed by general control unit 500. This also applies to the following exemplary variations.

First Exemplary Variation

In the above embodiment, whether how many times (or how frequently) a component subject to power management is used within a predetermined period of time is equal to or smaller than a threshold value or not is set as a power stopping condition for the component subject to power management. Furthermore, whether the number of components subject to power management still supplied with power is equal to or smaller than a threshold value or not is set as a power stopping condition changing condition.

In the present embodiment in a first exemplary variation, whether a component subject to power management is continuously unused for at least a predetermined period of time is set as a power stopping condition for the component subject to power management. Furthermore, whether a component/components subject to power management supplied with power consumes/together consume a total of power equal to or smaller than a predetermined threshold value or not is set as a power stopping condition changing condition.

Note that the FIG. 4 process performed by a power management unit to manage power supplied to a component subject to power management and the FIG. 7 process performed by general control unit 500 to shift a function block to the power saving mode are basically similar to the above embodiment, and accordingly, will be described with reference thereto, as appropriate.

With reference to FIG. 10, a power stopping condition will be described in accordance with the first exemplary variation of the embodiment of the present invention.

FIG. 10 shows a power stopping condition table describing a power stopping condition. In comparison with the FIG. 5 table, the FIG. 10 table describes how long a component subject to power management is unused, rather than how many times (or how frequently) the component subject to power management is used within a predetermined period of time, as a power stopping condition and a changed value. How long a component subject to power management is unused, as referred to herein, means a period of time elapsing after the component subject to power management is used before it is subsequently used. Accordingly, when the component subject to power management is continuously unused, how long it is unused will be accumulated. The power stopping condition table is also stored in data storage unit 526. The power stopping condition table describes a power stopping condition for each of all of the components subject to power management included in MFP 1.

While FIG. 10 shows by way of example identical values (i.e., 60 s) as a power stopping condition corresponding to all of the components subject to power management, the table may describe any (different) condition for each component subject to power management. Note that the power stopping condition table also indicates a changed value of the power stopping condition, which herein is identical values (of 30 s).

In the present embodiment in the first exemplary variation a power management unit stops supplying power to a component subject to power management when the power management unit determines that the component subject to power management is unused for at least a period of time indicated in the above power stopping condition table.

The power management unit can obtain how long a component subject to power management is unused, for example in the following method.

Whenever the power management unit has any component thereof subject to power management operated (or used), the power management unit associates information identifying the used component subject to power management with the date and time at which the component subject to power management is used, to create history-of-use information, and the power management unit stores the information to data storage unit 526. When the power management unit obtains the information of the operational status of the component subject to power management, the power management unit refers to the history-of-use information stored in data storage unit 526 that is the immediately previous (or latest) history-of-use information of the component subject to power management, and the power management unit thus obtains a difference from the current point in time to obtain how long the component subject to power management is unused.

Furthermore, as has been described previously, when a power stopping condition changing condition is satisfied, a power stopping condition's value of how long a component subject to power management is unused is changed, as shown in FIG. 10.

With reference to FIG. 11, a power stopping condition changing condition will be described in accordance with the first exemplary variation of the embodiment of the present invention.

FIG. 11 shows a power stopping condition changing condition table describing a power stopping condition changing condition. The power stopping condition changing condition table is stored in data storage unit 526. The power stopping condition changing condition table describes power stopping condition changing conditions corresponding to all of the function blocks, respectively, included in MFP 1.

The present exemplary variation by way of example provides as a power stopping condition changing condition a sum of power consumed by any components subject to power management in a function block that are currently supplied with power.

By way of example, for the ADF's function block, a power stopping condition changing condition equal to or smaller than 0.9 W is set. Similarly, for the console panel's function block, a power stopping condition changing condition equal to or smaller than 1.5 W is set. The other function blocks are similarly discussed by way of example.

In the present embodiment in the first exemplary variation a power management unit determines whether any components subject to power management in the corresponding function block that are currently supplied with power together consume a total of power equal to or smaller than a predetermined value corresponding to a power stopping condition changing condition or not, and if so, the power management unit changes a power stopping condition.

Note that the power stopping condition changing condition is one example, and any (different) condition can be described for each function block.

Hereinafter, when the function block of interest is ADF 400, the present embodiment in the first exemplary variation provides a process, as will be described more specifically hereinafter with reference to FIGS. 4 and 7 flowcharts described above.

Herein, ADF 400 has its components subject to power management all supplied with power for the sake of illustration. Note that MFP 1's power management units and components subject to power management each consume power (on average) as indicated in FIG. 8 for the sake of illustration.

Accordingly, at this point in time, ADF 400 as a whole consumes a power of 2.0 W at ADF controller 401, a power of 0.10 W at left-original sensor 402, a power of 0.15 W at ADF sensor 403, a power of 0.30 W at set-original sensor 404, a power of 0.50 W at sheet passage sensor 405, and a power of 1.0 W at drive unit 406 for a total of 4.05 W.

With reference to FIG. 4, ADF controller 401 sets left-original sensor 402 as a first target component subjected to power management, and determines that supplying power thereto is not stopped (NO at step S1). Then, ADF controller 401 refers to the power stopping condition table (FIG. 10)

stored in data storage unit 526 to read a power stopping condition corresponding to left-original sensor 402 (i.e., 60 s) (step S2).

Then ADF controller 401 obtains information of the operational status of left-original sensor 402. In the embodiment in the first exemplary variation, the operational status information is information indicating how long a component subject to power management is unused.

As has been described previously, ADF controller 401 obtains how long left-original sensor 402 is unused from the history-of-use information of left-original sensor 402 stored in data storage unit 526 (step S3). Herein, how long a component subject to power management included in ADF 400 is unused is shown in FIG. 12A for the sake of illustration.

Again with reference to FIG. 4, in step S4, ADF controller 401 compares how long left-original sensor 402 is unused (i.e., 90 s, see FIG. 12A) with the power stopping condition for left-original sensor 402 (i.e., 60 s, see FIG. 10). The former (i.e., 90 s) exceeds the latter (i.e., 60 s), and ADF controller 401 determines that left-original sensor 402 satisfies the power stopping condition (YES at step S4). Accordingly, ADF controller 401 stops supplying power to left-original sensor 402 (step S6).

Then, at step S8, ADF controller 401 determines that it has not completed its determination for all of the components subject to power management (NO at step S8), and ADF controller 401 sets ADF sensor 403 as a target of the process (step S7) and returns to step S1.

ADF controller 401 also subjects ADF sensor 403, set-original sensor 404, sheet passage sensor 405, and drive unit 406 to steps S1-S8, similarly as it has done for left-original sensor 402.

While herein no description is provided in line with the flowchart, each component subject to power management is subjected by ADF controller 401 to the following process.

With reference to FIG. 10 and FIG. 12A, how long ADF sensor 403 is unused (i.e., 70 s) is equal to or larger than its power stopping condition (i.e., 60 s), and accordingly, supplying power thereto is stopped. How long set-original sensor 404 is unused (i.e., 45 s) is smaller than its power stopping condition (i.e., 60 s), and accordingly, supplying power thereto is continued (or not stopped). How long sheet passage sensor 405 is unused (i.e., 30 s) is smaller than its power stopping condition (i.e., 60 s), and accordingly, supplying power thereto is continued (or not stopped). How long drive unit 406 is unused (i.e., 70 s) is equal to or larger than its power stopping condition (i.e., 60 s), and accordingly, supplying power thereto is stopped.

Thus, as described above, supplying power to left-original sensor 402, ADF sensor 403, and drive unit 406 is stopped. Thus, at this point in time, ADF 400 as a whole achieves a power consumption reduced from its initial power consumption of 4.05 W by 1.25 W to 2.80 W.

Again with reference to FIG. 4, ADF controller 401 determines that it has completed its determination for all of the components subject to power management (YES at step S8), and ADF controller 401 obtains the power supply statuses of the components subject to power management included in ADF 400 (step S9).

ADF controller 401 determines that the function block does not have its components subject to power management all unsupplied with power, (NO at step S10), and ADF controller 401 refers to the power stopping condition changing condition table (FIG. 11) stored in data storage unit 526 to read a power stopping condition changing condition corresponding to ADF 400 (step S11).

Then at step S12 any components subject to power management in the corresponding function block that are still supplied with power together consume a total of power (i.e., 0.8 W) equal to or smaller than the power stopping condition changing condition (i.e., 0.9 W), and ADF controller 401 determines that the power stopping condition changing condition is satisfied (YES at step S12).

Then at step S13 ADF controller 401 refers to the power stopping condition table (FIG. 10) stored in data storage unit 526 to change the power stopping condition's value.

More specifically, ADF controller 401 changes the power stopping condition for the components subject to power management included in ADF 400 from 60 s to 30 s. ADF controller 401 subsequently returns to step S1.

At this point in time, left-original sensor 402, ADF sensor 403, and drive unit 406 are not supplied with power, and accordingly, only set-original sensor 404 and sheet passage sensor 405 are subjected to steps S2-S6.

How long the components subject to power management included in ADF 400 have been unused, as counted at this point in time, is indicated as shown in FIG. 12B for the sake of illustration. Time has elapsed since how long the components subject to power management had been unused was previously obtained, and accordingly, how long the components subject to power management are unused has varied from FIG. 12A to FIG. 12B.

Note that FIG. 12B indicates "-", which means that supplying power to a component subject to power management is stopped based on how long the component subject to power management is unused, as shown in FIG. 12A.

How long set-original sensor 404 is unused (i.e., 40 s) is equal to or larger than its power stopping condition (i.e., 30 s), and accordingly, ADF controller 401 stops supplying power to set-original sensor 404 (step S6). Furthermore, how long sheet passage sensor 405 is unused (i.e., 40 s) is equal to or larger than its power stopping condition (i.e., 30 s), and accordingly, ADF controller 401 stops supplying power to sheet passage sensor 405 (step S6). At this point in time, set-original sensor 404's power consumption (0.30 W) and sheet passage sensor 405's power consumption (0.5 W) are reduced and accordingly, ADF 400's power consumption will only be ADF controller 401's power consumption (2.0 W).

Then ADF controller 401 determines in step S10 that the function block has its components subject to power management all unsupplied with power (YES at step S10), and ADF controller 401 notifies general control unit 500 accordingly (step S14). In response, general control unit 500 shifts ADF 400 to the power saving mode. ADF 400, having been shifted to the power saving mode, is supplied with only a minimum power required to perform a process to return from the power saving mode to the normal mode. In the power saving mode, ADF 400 is supplied with power having a sufficiently smaller value than a power normally consumed by ADF controller 401 (i.e., 2.0 W).

While the above description has been made with ADF 400 serving as one example of a function block, the other function blocks, i.e., scanner 300, printer 200, console panel 100, and USB I/F unit 600, are also subjected to a similar process. More specifically, the power management unit included in each function block performs the FIG. 4 process to manage supplying power to components subject to power management.

Thus the present invention in the embodiment in the first exemplary variation provides MFP 1 that depends on a power supply status of a component subject to power management to change a condition for determining whether to stop supplying power to the component subject to power management, i.e., a power stopping condition. More specifically, when any components subject to power management supplied with power together consume reduced power, the present MFP 1 changes the power stopping condition to promote determination to stop supplying power.

In an MFP or a similar image formation apparatus when a function block does not have a large number of components subject to power management supplied with power (i.e., has any components subject to power management supplied with power together consuming small power), it is often the case that the function block also has the remaining component(s) subject to power management supplied with power less likely to be used.

However, conventional image formation apparatuses have fixed power stopping conditions for components subject to power management, and cannot shift to the power saving mode a function block with components subject to power management together consuming small power, and thus have a limit in effectively reducing power consumption. Furthermore, if supplying power is stopped for a long unused component subject to power management individually, supplying power to the power management unit (or controller) cannot be stopped without shifting the function block entirely to the power saving mode, and there is a limit in effectively reducing power consumption.

Accordingly the present invention in the embodiment in the first exemplary variation provides MFP 1 that can depend on a power supply status of a component subject to power management to change a power stopping condition to stop power supplied to the component subject to power management earlier than conventional while maintaining the user's convenience. Consequently, it also allows a function block to be shifted to the power saving mode early and can reduce a controller's power consumption. This can reduce power consumption more effectively than conventional.

Second Exemplary Variation

In present invention in the first exemplary variation, whether a component subject to power management is continuously unused for at least a predetermined period of time has been set as a power stopping condition for the component subject to power management. Furthermore, whether a component/components subject to power management supplied with power consumes/together consume a total of power equal to or smaller than a predetermined threshold value or not has been set as a power stopping condition changing condition.

In the present embodiment in a second exemplary variation, whether a component subject to power management is continuously unused for at least a predetermined period of time is set as a power stopping condition for the component subject to power management. Furthermore, whether how many of components subject to power management is/are supplied with power is equal to or smaller than a predetermined value or not is set as a power stopping condition changing condition.

Note that the FIG. 4 process performed by a power management unit to manage power supplied to a component subject to power management and the FIG. 7 process performed by general control unit 500 to shift a function block to the power saving mode are basically similar to the above embodiment, and accordingly, will be described with reference thereto, as appropriate.

The present invention in the second exemplary variation provides a power stopping condition similar to that described with reference to FIG. 10, and accordingly, it will not be described repeatedly in detail.

In the present embodiment in the second exemplary variation, as has been described previously, a power management unit stops supplying power to a component subject to power management when the power management unit determines that the component subject to power management is unused for at least a period of time indicated in the above power stopping condition table.

Furthermore, as has been described previously, when a power stopping condition changing condition is satisfied, a power stopping condition's value of how long a component subject to power management is unused is changed, as shown in FIG. 10.

The present invention in the embodiment in the second exemplary variation provides a power stopping condition changing condition similar to that described with reference to FIG. 6, and accordingly, it will not be described repeatedly in detail.

In the present embodiment in the second exemplary variation, as has been described previously, a power management unit determines whether the number of components subject to power management currently supplied with power is equal to or smaller than a predetermined number corresponding to a power stopping condition changing condition, and if so, the power management unit changes a power stopping condition.

Hereinafter, when the function block of interest is ADF 400, the present embodiment in the second exemplary variation provides a process, as will be described more specifically hereinafter with reference to FIGS. 4 and 7 flowcharts described above.

Herein, ADF 400 has its components subject to power management all supplied with power for the sake of illustration. Note that MFP 1's power management units and components subject to power management each consume power (on average) as indicated in FIG. 8 for the sake of illustration.

Accordingly, at this point in time, ADF 400 as a whole consumes a power of 2.0 W at ADF controller 401, a power of 0.10 W at left-original sensor 402, a power of 0.15 W at ADF sensor 403, a power of 0.30 W at set-original sensor 404, a power of 0.50 W at sheet passage sensor 405, and a power of 1.0 W at drive unit 406 for a total of 4.05 W.

With reference to FIG. 4, ADF controller 401 sets left-original sensor 402 as a first target component subjected to power management, and determines that supplying power thereto is not stopped (NO at step S1). Then, ADF controller 401 refers to the power stopping condition table (FIG. 10) stored in data storage unit 526 to read a power stopping condition corresponding to left-original sensor 402 (i.e., 60 s) (step S2).

Then ADF controller 401 obtains information of the operational status of left-original sensor 402. In the embodiment in the second exemplary variation, the operational status information is information indicating how long a component subject to power management is unused.

As has been described previously, ADF controller 401 obtains how long left-original sensor 402 is unused from the history-of-use information of left-original sensor 402 stored in data storage unit 526 (step S3). Herein, how long a component subject to power management included in ADF 400 is unused is shown in FIG. 12A for the sake of illustration.

Again with reference to FIG. 4, in step S4, ADF controller 401 compares how long left-original sensor 402 is unused (i.e., 90 s, see FIG. 12A) with the power stopping condition for left-original sensor 402 (i.e., 60 s, see FIG. 10). The former (i.e., 90 s) exceeds the latter (i.e., 60 s), and ADF controller 401 determines that left-original sensor 402 satisfies the power stopping condition (YES at step S4). Accordingly, ADF controller 401 stops supplying power to left-original sensor 402 (step S6).

Then, at step S8, ADF controller 401 determines that it has not completed its determination for all of the components subject to power management (NO at step S8), and ADF controller 401 sets ADF sensor 403 as a target of the process (step S7) and returns to step S1.

ADF controller 401 also subjects ADF sensor 403, set-original sensor 404, sheet passage sensor 405, and drive unit 406 to steps S1-S8, similarly as it has done for left-original sensor 402.

While herein no description is provided in line with the flowchart, each component subject to power management is subjected by ADF controller 401 to the following process.

With reference to FIG. 10 and FIG. 12A, how long ADF sensor 403 is unused (i.e., 70 s) is equal to or larger than its power stopping condition (i.e., 60 s), and accordingly, supplying power thereto is stopped. How long set-original sensor 404 is unused (i.e., 45 s) is smaller than its power stopping condition (i.e., 60 s), and accordingly, supplying power thereto is continued (or not stopped). How long sheet passage sensor 405 is unused (i.e., 30 s) is smaller than its power stopping condition (i.e., 60 s), and accordingly, supplying power thereto is continued (or not stopped). How long drive unit 406 is unused (i.e., 70 s) is equal to or larger than its power stopping condition (i.e., 60 s), and accordingly, supplying power thereto is stopped.

Thus, as described above, supplying power to left-original sensor 402, ADF sensor 403, and drive unit 406 is stopped. Thus, at this point in time, ADF 400 as a whole achieves a power consumption reduced from its initial power consumption of 4.05 W by 1.25 W to 2.80 W.

Again with reference to FIG. 4, ADF controller 401 determines that it has completed its determination for all of the components subject to power management (YES at step S8), and ADF controller 401 obtains the power supply statuses of the components subject to power management included in ADF 400 (step S9).

ADF controller 401 determines that the function block does not have its components subject to power management all unsupplied with power, (NO at step S10), and ADF controller 401 refers to the power stopping condition changing condition table (FIG. 6) stored in data storage unit 526 to read a power stopping condition changing condition corresponding to ADF 400 (step S11).

Then at step S12 the number of components subject to power management currently supplied with power (i.e., the two components of set-original sensor 404 and sheet passage sensor 405) is equal to or smaller than the power stopping condition changing condition, and ADF controller 401 determines that the power stopping condition changing condition is satisfied (YES at step S12).

Then at step S13 ADF controller 401 refers to the power stopping condition table (FIG. 10) stored in data storage unit 526 to change the power stopping condition's value.

More specifically, ADF controller 401 changes the power stopping condition for the components subject to power management included in ADF 400 from 60 s to 30 s. ADF controller 401 subsequently returns to step S1.

At this point in time, left-original sensor 402, ADF sensor 403, and drive unit 406 are not supplied with power, and accordingly, only set-original sensor 404 and sheet passage sensor 405 are subjected to steps S2-S6.

How long the components subject to power management included in ADF 400 have been unused, as counted at this point in time, is indicated as shown in FIG. 12B for the sake of illustration. Time has elapsed since how long the components subject to power management had been unused was previously obtained, and accordingly, how long the components subject to power management are unused has varied from FIG. 12A to FIG. 12B.

How long set-original sensor 404 is unused (i.e., 40 s) is equal to or larger than its power stopping condition (i.e., 30 s), and accordingly, ADF controller 401 stops supplying power to set-original sensor 404 (step S6). Furthermore, how long sheet passage sensor 405 is unused (i.e., 40 s) is equal to or larger than its power stopping condition (i.e., 30 s), and accordingly, ADF controller 401 stops supplying power to sheet passage sensor 405 (step S6). At this point in time, set-original sensor 404's power consumption (0.30 W) and sheet passage sensor 405's power consumption (0.5 W) are reduced and accordingly, ADF 400's power consumption will only be ADF controller 401's power consumption (2.0 W).

Then ADF controller 401 determines in step S10 that the function block has its components subject to power management all unsupplied with power (YES at step S10), and ADF controller 401 notifies general control unit 500 accordingly (step S14). In response, general control unit 500 shifts ADF 400 to the power saving mode. ADF 400, having been shifted to the power saving mode, is supplied with only a minimum power required to perform a process to return from the power saving mode to the normal mode. In the power saving mode, ADF 400 is supplied with power having a sufficiently smaller value than a power normally consumed by ADF controller 401 (i.e., 2.0 W).

While the above description has been made with ADF 400 serving as one example of a function block, the other function blocks, i.e., scanner 300, printer 200, console panel 100, and USB I/F unit 600, are also subjected to a similar process. More specifically, the power management unit included in each function block performs the FIG. 4 process to manage supplying power to components subject to power management.

Thus the present invention in the embodiment in the second exemplary variation provides MFP 1 that depends on a power supply status of a component subject to power management to change a condition for determining whether to stop supplying power to the component subject to power management, i.e., a power stopping condition. More specifically, when a reduced number of components subject to power management are supplied with power, MFP 1 changes the power stopping condition to promote determination to stop supplying power.

In an MFP or a similar image formation apparatus when a function block does not have a large number of components subject to power management supplied with power (i.e., has a large number of components subject to power management less frequently used), it is often the case that the function block also has the remaining component(s) subject to power management supplied with power less likely to be used.

However, conventional image formation apparatuses have fixed power stopping conditions for components subject to power management, and cannot shift to the power saving mode a function block having a large number of less frequently used components subject to power management, and thus have a limit in effectively reducing power consumption. Furthermore, if supplying power is stopped for a long unused component subject to power management individually, supplying power to the power management unit (or controller)

cannot be stopped without shifting the function block entirely to the power saving mode, and there is a limit in effectively reducing power consumption.

Accordingly the present invention in the embodiment in the second exemplary variation provides MFP 1 that can depend on a power supply status of a component subject to power management to change a power stopping condition to stop power supplied to the component subject to power management earlier than conventional while maintaining the user's convenience. Consequently, it also allows a function block to be shifted to the power saving mode early and can reduce a controller's power consumption. This can reduce power consumption more effectively than conventional.

Third Exemplary Variation

In the present embodiment in the second exemplary variation, whether a component subject to power management is continuously unused for at least a predetermined period of time has been set as a power stopping condition for the component subject to power management. Furthermore, whether the number of components subject to power management currently supplied with power is equal to or smaller than a threshold value or not has been set as a power stopping condition changing condition.

In the embodiment in a third exemplary variation, whether how many times (or how frequently) a component subject to power management is used within a predetermined period of time is equal to or smaller than a predetermined threshold value or not is set as a power stopping condition for the component subject to power management. Furthermore, whether a component/components subject to power management supplied with power consumes/together consume a total of power equal to or smaller than a predetermined threshold value or not is set as a power stopping condition changing condition.

Note that the FIG. 4 process performed by a power management unit to manage power supplied to a component subject to power management and the FIG. 7 process performed by general control unit 500 to shift a function block to the power saving mode are basically similar to the above embodiment, and accordingly, will be described with reference thereto, as appropriate.

The present invention in the embodiment in the third exemplary variation provides a power stopping condition similar to that described with reference to FIG. 5, and accordingly, it will not be described repeatedly in detail.

In the present embodiment in the third exemplary variation, as has been described previously, a power management unit stops supplying power to a component subject to power management when the power management unit determines that how frequently the component subject to power management is used for a predetermined period of time is equal to or smaller than frequency indicated in the above power stopping condition table.

Furthermore, as has been described previously, when a power stopping condition changing condition is satisfied, a power stopping condition's value of how frequently a component subject to power management is used is changed, as shown in FIG. 5.

The present invention in the embodiment in the third exemplary variation provides a power stopping condition changing condition similar to that described with reference to FIG. 11, and accordingly, it will not be described repeatedly in detail.

In the present embodiment in the third exemplary variation, as has been described previously, a power management unit determines whether any components subject to power management in the corresponding function block that are currently supplied with power together consume a total of power equal to or smaller than a predetermined value corresponding to a power stopping condition changing condition or not, and if so, the power management unit changes a power stopping condition.

Hereinafter, when the function block of interest is ADF 400, the present embodiment in the third exemplary variation provides a process, as will be described more specifically hereinafter with reference to FIGS. 4 and 7 flowcharts described above.

Herein, ADF 400 has its components subject to power management all supplied with power for the sake of illustration. Note that MFP 1's power management units and components subject to power management each consume power (on average) as indicated in FIG. 8 for the sake of illustration.

Accordingly, at this point in time, ADF 400 as a whole consumes a power of 2.0 W at ADF controller 401, a power of 0.10 W at left-original sensor 402, a power of 0.15 W at ADF sensor 403, a power of 0.30 W at set-original sensor 404, a power of 0.50 W at sheet passage sensor 405, and a power of 1.0 W at drive unit 406 for a total of 4.05 W.

With reference to FIG. 4, ADF controller 401 sets left-original sensor 402 as a first target component subjected to power management, and determines that supplying power thereto is not stopped (NO at step S1). Then, ADF controller 401 refers to the power stopping condition table (FIG. 5) stored in data storage unit 526 to read a power stopping condition corresponding to left-original sensor 402 (i.e., 7 times) (step S2).

Then ADF controller 401 obtains information of the operational status of left-original sensor 402. In the present embodiment in the third exemplary variation, the information of the operational status of a component subjected to power management indicates how frequently the component subject to power management is used within a predetermined period of time.

As has been described previously, ADF controller 401 obtains how frequently left-original sensor 402 is used from the history-of-use information of left-original sensor 402 stored in data storage unit 526 (step S3). Herein, how frequently the components subject to power management included in ADF 400 are used is shown in FIG. 9A for the sake of illustration.

Again with reference to FIG. 4, in step S4, ADF controller 401 compares how frequently left-original sensor 402 is used (i.e., once, see FIG. 9A) with the power stopping condition for left-original sensor 402 (i.e., 7 times, see FIG. 5). The former (i.e., once) is smaller than the latter (i.e., 7 times), and ADF controller 401 determines that left-original sensor 402 satisfies the power stopping condition (YES at step S4). Accordingly, ADF controller 401 stops supplying power to left-original sensor 402 (step S6).

Then, at step S8, ADF controller 401 determines that it has not completed its determination for all of the components subject to power management (NO at step S8), and ADF controller 401 sets ADF sensor 403 as a target of the process (step S7) and returns to step S1.

ADF controller 401 also subjects ADF sensor 403, set-original sensor 404, sheet passage sensor 405, and drive unit 406 to steps S1-S8, similarly as it has done for left-original sensor 402.

While herein no description is provided in line with the flowchart, each component subject to power management is subjected by ADF controller 401 to the following process.

With reference to FIG. 5 and FIG. 9A, how many times ADF sensor 403 is used (i.e., 7 times) is equal to or smaller than its power stopping condition (i.e., 7 times), and accordingly, supplying power thereto is stopped. How many times set-original sensor 404 is used (i.e., 10 times) is larger than its power stopping condition (i.e., 7 times), and accordingly, supplying power thereto is continued (or not stopped). How many times sheet passage sensor 405 is used (i.e., 12 times) is larger than its power stopping condition (i.e., 7 times), and accordingly, supplying power thereto is continued (or not stopped). How many times drive unit 406 is used (i.e., 7 times) is equal to or smaller than its power stopping condition (i.e., 7 times), and accordingly, supplying power thereto is stopped.

Thus, as described above, supplying power to left-original sensor 402, ADF sensor 403, and drive unit 406 is stopped. Thus, at this point in time, ADF 400 as a whole achieves a power consumption reduced from its initial power consumption of 4.05 W by 1.25 W to 2.80 W.

Again with reference to FIG. 4, ADF controller 401 determines that it has completed its determination for all of the components subject to power management (YES at step S8), and ADF controller 401 obtains the power supply statuses of the components subject to power management included in ADF 400 (step S9).

ADF controller 401 determines that the function block does not have its components subject to power management all unsupplied with power, (NO at step S10), and ADF controller 401 refers to the power stopping condition changing condition table (FIG. 11) stored in data storage unit 526 to read a power stopping condition changing condition corresponding to ADF 400 (step S11).

Then at step S12 any components subject to power management in the corresponding function block that are currently supplied with power (i.e., set-original sensor 404 and sheet passage sensor 405) together consume a total of power (i.e., 0.8 W) equal to or smaller than the power stopping condition changing condition (i.e., 0.9 W), and ADF controller 401 determines that the power stopping condition changing condition is satisfied (YES at step S12).

Then at step S13 ADF controller 401 refers to the power stopping condition table (FIG. 5) stored in data storage unit 526 to change the power stopping condition's value.

More specifically, ADF controller 401 changes the power stopping condition for the components subject to power management included in ADF 400 from 7 times to 10 times. ADF controller 401 subsequently returns to step S1.

At this point in time, left-original sensor 402, ADF sensor 403, and drive unit 406 are not supplied with power, and accordingly, only set-original sensor 404 and sheet passage sensor 405 are subjected to steps S2-S6.

How frequently the components subject to power management included in ADF 400 have been used, as counted at this point in time, is indicated as shown in FIG. 9B for the sake of illustration. Time has elapsed since how frequently the components subject to power management had been used was previously obtained, and accordingly, how frequently the components subject to power management are used has varied from FIG. 9A to FIG. 9B.

How many times set-original sensor 404 is used (i.e., 9 times) is equal to or smaller than its power stopping condition (i.e., 10 times), and accordingly, ADF controller 401 stops supplying power to set-original sensor 404 (step S6). Furthermore, how many times sheet passage sensor 405 is used (i.e., 10 times) is equal to or smaller than its power stopping condition (i.e., 10 times), and accordingly, ADF controller 401 stops supplying power to sheet passage sensor 405 (step S6). At this point in time, set-original sensor 404's power consumption (0.30 W) and sheet passage sensor 405's power consumption (0.5 W) are reduced and accordingly, ADF 400's power consumption will only be ADF controller 401's power consumption (2.0 W).

Then ADF controller 401 determines in step S10 that the function block has its components subject to power management all unsupplied with power (YES at step S10), and ADF controller 401 notifies general control unit 500 accordingly (step S14). In response, general control unit 500 shifts ADF 400 to the power saving mode. ADF 400, having been shifted to the power saving mode, is supplied with only a minimum power required to perform a process to return from the power saving mode to the normal mode. In the power saving mode, ADF 400 is supplied with power having a sufficiently smaller value than a power normally consumed by ADF controller 401 (i.e., 2.0 W).

While the above description has been made with ADF 400 serving as one example of a function block, the other function blocks, i.e., scanner 300, printer 200, console panel 100, and USB I/F unit 600, are also subjected to a similar process. More specifically, the power management unit included in each function block performs the FIG. 4 process to manage supplying power to components subject to power management.

Thus in accordance with the present invention MFP 1 depends on a power supply status of a component subject to power management to change a condition for determining whether to stop supplying power to the component subject to power management, i.e., a power stopping condition. More specifically, when any components subject to power management supplied with power together consume reduced power, the present MFP 1 changes the power stopping condition to promote determination to stop supplying power.

In an MFP or a similar image formation apparatus when a function block does not have a large number of components subject to power management supplied with power (i.e., has any components subject to power management supplied with power together consuming small power), it is often the case that the function block also has the remaining component(s) subject to power management supplied with power less likely to be used.

However, conventional image formation apparatuses have fixed power stopping conditions for components subject to power management, and cannot shift to the power saving mode a function block with components subject to power management together consuming small power, and thus have a limit in effectively reducing power consumption. Furthermore, if supplying power is stopped for a less frequently used component subject to power management individually, supplying power to the power management unit (or controller) cannot be stopped without shifting the function block entirely to the power saving mode, and there is a limit in effectively reducing power consumption.

Accordingly the present invention in the embodiment in the third exemplary variation provides MFP 1 that can depend on a power supply status of a component subject to power management to change a power stopping condition to stop power supplied to the component subject to power management earlier than conventional while maintaining the user's convenience. Consequently, it also allows a function block to be shifted to the power saving mode early and can reduce a controller's power consumption. This can reduce power consumption more effectively than conventional.

Note that there can also be provided a method causing a computer to function to exert such control as described with reference to the above flow, or a program implementing the method. Such a program can also be stored in a flexible disc, compact disk-read only memory, (CD-ROM), read only memory (ROM), random access memory (RAM), a memory card and/or a similar, non-transient, computer readable storage medium accompanying the computer, and can also be provided as a program product. Alternatively, it can be stored and provided in a storage medium such as a hard disc incorporated in the computer. Furthermore, it can also be downloaded through a network and thus provided.

Note that the program may be a program allowing a necessary one of program modules that are provided as part of an operating system (OS) of the computer to be invoked in a predetermined sequence, as timed as predetermined, to cause a process to be performed. In that case, the program per se does not include the module, and cooperates with the OS to perform the process. Such a program excluding a module, as described above, can also be included in the program of the present invention.

Furthermore the present program may be incorporated in a portion of another program and thus provided. In that case the present program per se does not include a module included in the other program, either, and the former program cooperates with the latter program to perform a process. Such a program incorporated in another program, as described above, can also be included in the program of the present invention.

A program product provided is installed in a hard disc or a similar program storage unit and executed. Note that the program product includes a program per se and a storage medium having the program stored therein.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An image formation apparatus having a plurality of function units, comprising:
   a first power management unit configured to perform power management for supplying power for each of said function units;
   a plurality of components under the power management, provided in each said function unit and each supplied with power to implement a corresponding function; and
   a second power management unit provided for each said function unit and managing supplying power for each of said components, wherein said second power management unit is configured to:
      determine whether each said component has an operational status satisfying a first predetermined condition, wherein said first predetermined condition is whether how frequently said component is used is equal to or smaller than a predetermined value or not,
      stop supplying power to said component satisfying said first predetermined condition, if said component satisfies said first predetermined condition,
      determine whether said plurality of components have a power supply status satisfying a second predetermined condition, wherein said second predetermined condition is whether how many of said components is/are supplied with power is equal to or smaller than a predetermined value or not,
      change said first predetermined condition in content, if said second predetermined condition is satisfied, wherein said first power management unit sets to a power saving mode said function unit of which components are all unsupplied with power.

2. The image formation apparatus according to claim 1, wherein when said second power management unit determines that said second predetermined condition is satisfied, said second power management unit changes said predetermined value of said first predetermined condition to a larger value.

3. An image formation apparatus having a plurality of function units, comprising:
   a first power management unit configured to perform power management for supplying power for each of said function units;
   a plurality of components under the power management, provided in each said function unit and each supplied with power to implement a corresponding function; and
   a second power management unit provided for each said function unit and managing supplying power for each of said components, wherein said second power management unit is configured to:
      determine whether each said component has an operational status satisfying a first predetermined condition, wherein said first predetermined condition is whether how frequently said component is used is equal to or smaller than a predetermined value or not,
      stop supplying power to said component satisfying said first predetermined condition, if said component satisfies said first predetermined condition,
      determine whether said plurality of components have a power supply status satisfying a second predetermined condition, wherein said second predetermined condition is whether that/those of said components which is/are supplied with power consumes/together consume a total of power equal to or smaller than a predetermined value or not,
      change said first predetermined condition in content, if said second predetermined condition is satisfied, wherein said first power management unit sets to a power saving mode said function unit of which components are all unsupplied with power.

4. The image formation apparatus according to claim 3, wherein when said second power management unit determines that said second predetermined condition is satisfied, said second power management unit changes said predetermined value of said first predetermined condition to a larger value.

5. An image formation apparatus having a plurality of function units, comprising:
   a first power management unit configured to perform power management for supplying power for each of said function units;
   a plurality of components under the power management, provided in each said function unit and each supplied with power to implement a corresponding function; and
   a second power management unit provided for each said function unit and managing supplying power for each of said components, wherein said second power management unit is configured to:
      determine whether each said component has an operational status satisfying a first predetermined condition, wherein said first predetermined condition is whether how long period of time said component has been unused for since said component was immediately previously used is equal to or larger than a predetermined value or not,
      stop supplying power to said component satisfying said first predetermined condition, if said component satisfies said first predetermined condition,
      determine whether said plurality of components have a power supply status satisfying a second predetermined condition, wherein said second predetermined condition is whether how many of said components is/are supplied with power is equal to or smaller than a predetermined value or not, change said first predetermined condition in content, if said second predetermined condition is satisfied, wherein said first power management unit sets to a power saving mode said function unit of which components are all unsupplied with power.

6. The image formation apparatus according to claim 5, wherein when said second power management unit determines that said second predetermined condition is satisfied, said second power management unit changes said predetermined value of said first predetermined condition to a smaller value.

7. An image formation apparatus having a plurality of function units, comprising:
 a first power management unit configured to perform power management for supplying power for each of said function units;
 a plurality of components under the power management, provided in each said function unit and each supplied with power to implement a corresponding function; and
 a second power management unit provided for each said function unit and managing supplying power for each of said components, wherein said second power management unit is configured to:
  determine whether each said component has an operational status satisfying a first predetermined condition, wherein said first predetermined condition is whether how long period of time said component has been unused for since said component was immediately previously used is equal to or larger than a predetermined value or not,
  stop supplying power to said component satisfying said first predetermined condition, if said component satisfies said first predetermined condition,
  determine whether said plurality of components have a power supply status satisfying a second predetermined condition, wherein said second predetermined condition is whether that/those of said components which is/are supplied with power consumes/together consume a total of power equal to or smaller than a predetermined value or not,
  change said first predetermined condition in content, if said second predetermined condition is satisfied, wherein said first power management unit sets to a power saving mode said function unit of which components are all unsupplied with power.

8. The image formation apparatus according to claim 7, wherein when said second power management unit determines that said second predetermined condition is satisfied, said second power management unit changes said predetermined value of said first predetermined condition to a smaller value.

9. A method for controlling an image formation apparatus having a plurality of function units, and provided with a plurality of components under power management provided in each said function unit and each supplied with power to implement a corresponding function, comprising the steps of:
 managing supplying power for each of said function units; and
 managing supplying power for each of said components for each said function unit, the step of managing supplying power for each of said components for each said function unit including the steps of:
  determining whether each said component has an operational status satisfying a first predetermined condition, wherein said first predetermined condition is whether how frequently said component is used is equal to or smaller than a predetermined value or not,
  if in the step of determining whether each said component has the operational status satisfying the first predetermined condition it is determined that said component satisfies said first predetermined condition, then stopping supplying power to said component satisfying said first predetermined condition,
  determining whether said plurality of components have a power supply status satisfying a second predetermined condition, wherein said second predetermined condition is whether how many of said components is/are supplied with power is equal to or smaller than a predetermined value or not,
  if in the step of determining whether said plurality of components have the power supply status satisfying the second predetermined condition it is determined that said second predetermined condition is satisfied, then changing said first predetermined condition in content, the step of managing supplying power for each of said function units including the step of setting to a power saving mode said function unit of which components are all unsupplied with power.

10. The method for controlling an image formation apparatus according to claim 9, wherein if it is determined that said second predetermined condition is satisfied, then, in the step of changing, said predetermined value of said first predetermined condition is changed to a larger value.

11. A method for controlling an image formation apparatus having a plurality of function units, and provided with a plurality of components under power management provided in each said function unit and each supplied with power to implement a corresponding function, comprising the steps of:
 managing supplying power for each of said function units; and
 managing supplying power for each of said components for each said function unit, the step of managing supplying power for each of said components for each said function unit including the steps of:
  determining whether each said component has an operational status satisfying a first predetermined condition, wherein said first predetermined condition is whether how frequently said component is used is equal to or smaller than a predetermined value or not,
  if in the step of determining whether each said component has the operational status satisfying the first predetermined condition it is determined that said component satisfies said first predetermined condition, then stopping supplying power to said component satisfying said first predetermined condition,
  determining whether said plurality of components have a power supply status satisfying a second predetermined condition, wherein said second predetermined condition is whether that/those of said components which is/are supplied with power consumes/together consume a total of power equal to or smaller than a predetermined value or not,
  if in the step of determining whether said plurality of components have the power supply status satisfying the second predetermined condition it is determined that said second predetermined condition is satisfied, then changing said first predetermined condition in content, the step of managing supplying power for each of said function units including the step of setting to a power saving mode said function unit of which components are all unsupplied with power.

12. The method for controlling an image formation apparatus according to claim 11, wherein if it is determined that said second predetermined condition is satisfied, then, in the step of changing, said predetermined value of said first predetermined condition is changed to a larger value.

13. A method for controlling an image formation apparatus having a plurality of function units, and provided with a plurality of components under power management provided in each said function unit and each supplied with power to implement a corresponding function, comprising the steps of:

managing supplying power for each of said function units; and managing supplying power for each of said components for each said function unit, the step of managing supplying power for each of said components for each said function unit including the steps of:

determining whether each said component has an operational status satisfying a first predetermined condition, wherein said first predetermined condition is whether how long period of time said component has been unused for since said component was immediately previously used is equal to or larger than a predetermined value or not, if in the step of determining whether each said component has the operational status satisfying the first predetermined condition it is determined that said component satisfies said first predetermined condition, then stopping supplying power to said component satisfying said first predetermined condition, determining whether said plurality of components have a power supply status satisfying a second predetermined condition, wherein said second predetermined condition is whether how many of said components is/are supplied with power is equal to or smaller than a predetermined value or not, if in the step of determining whether said plurality of components have the power supply status satisfying the second predetermined condition it is determined that said second predetermined condition is satisfied, then changing said first predetermined condition in content, the step of managing supplying power for each of said function units including the step of setting to a power saving mode said function unit of which components are all unsupplied with power.

14. The method for controlling an image formation apparatus according to claim 13, wherein if it is determined that said second predetermined condition is satisfied, then, in the step of changing, said predetermined value of said first predetermined condition is changed to a smaller value.

15. A method for controlling an image formation apparatus having a plurality of function units, and provided with a plurality of components under power management provided in each said function unit and each supplied with power to implement a corresponding function, comprising the steps of:

managing supplying power for each of said function units; and managing supplying power for each of said components for each said function unit, the step of managing supplying power for each of said components for each said function unit including the steps of:

determining whether each said component has an operational status satisfying a first predetermined condition, wherein said first predetermined condition is whether how long period of time said component has been unused for since said component was immediately previously used is equal to or larger than a predetermined value or not, if in the step of determining whether each said component has the operational status satisfying the first predetermined condition it is determined that said component satisfies said first predetermined condition, then stopping supplying power to said component satisfying said first predetermined condition, determining whether said plurality of components have a power supply status satisfying a second predetermined condition, wherein said second predetermined condition is whether that/those of said components which is/are supplied with power consumes/together consume a total of power equal to or smaller than a predetermined value or not, if in the step of determining whether said plurality of components have the power supply status satisfying the second predetermined condition it is determined that said second predetermined condition is satisfied, then changing said first predetermined condition in content, the step of managing supplying power for each of said function units including the step of setting to a power saving mode said function unit of which components are all unsupplied with power.

16. The method for controlling an image formation apparatus according to claim 1, wherein if it is determined that said second predetermined condition is satisfied, then, in the step of changing, said predetermined value of said first predetermined condition is changed to a smaller value.

17. A non-transitory storage medium having stored therein a control program readable by a computer of an image formation apparatus having a plurality of function units, and provided with a plurality of components under power management provided in each said function unit and each supplied with power to implement a corresponding function, said control program causing said computer to perform a process including the steps of:

managing supplying power for each of said function units; and managing supplying power for each of said components for each said function unit, the step of managing supplying power for each of said components for each said function unit including the steps of:

determining whether each said component has an operational status satisfying a first predetermined condition, wherein said first predetermined condition is whether how frequently said component is used is equal to or smaller than a predetermined value or not, if in the step of determining whether each said component has the operational status satisfying the first predetermined condition it is determined that said component satisfies said first predetermined condition, then stopping supplying power to said component satisfying said first predetermined condition, determining whether said plurality of components have a power supply status satisfying a second predetermined condition, wherein said second predetermined condition is whether how many of said components is/are supplied with power is equal to or smaller than a predetermined value or not, if in the step of determining whether said plurality of components have the power supply status satisfying the second predetermined condition it is determined that said second predetermined condition is satisfied, then changing said first predetermined condition in content, the step of managing supplying power for each of said function units including the step of setting to a power saving mode said function unit of which components are all unsupplied with power.

18. The non-transitory storage medium according to claim 17, wherein if it is determined that said second predetermined condition is satisfied, then, in the step of changing, said predetermined value of said first predetermined condition is changed to a larger value.

19. A non-transitory storage medium having stored therein a control program readable by a computer of an image formation apparatus having a plurality of function units, and provided with a plurality of components under power management provided in each said function unit and each supplied with power to implement a corresponding function, said control program causing said computer to perform a process including the steps of:

managing supplying power for each of said function units; and managing supplying power for each of said components for each said function unit, the step of managing supplying power for each of said components for each said function unit including the steps of:

determining whether each said component has an operational status satisfying a first predetermined condition, wherein said first predetermined condition is whether how frequently said component is used is equal to or smaller than a predetermined value or not, if in the step of determining whether each said component has the operational status satisfying the first predetermined condition it is determined that said component satisfies said first predetermined condition, then stopping supplying power to said component satisfying said first predetermined condition, determining whether said plurality of components have a power supply status satisfying a second predetermined condition, wherein said second predetermined condition is whether that/those of said components which is/are supplied with power consumes/together consume a total of power equal to or smaller than a predetermined value or not, if in the step of determining whether said plurality of components have the power supply status satisfying the second predetermined condition it is determined that said second predetermined condition is satisfied, then changing said first predetermined condition in content, the step of managing supplying power for each of said function units including the step of setting to a power saving mode said function unit of which components are all unsupplied with power.

20. The non-transitory storage medium according to claim 19, wherein if it is determined that said second predetermined condition is satisfied, then, in the step of changing, said predetermined value of said first predetermined condition is changed to a larger value.

21. A non-transitory storage medium having stored therein a control program readable by a computer of an image formation apparatus having a plurality of function units, and provided with a plurality of components under power management provided in each said function unit and each supplied with power to implement a corresponding function, said control program causing said computer to perform a process including the steps of:

managing supplying power for each of said function units; and managing supplying power for each of said components for each said function unit, the step of managing supplying power for each of said components for each said function unit including the steps of:

determining whether each said component has an operational status satisfying a first predetermined condition, wherein said first predetermined condition is whether how long period of time said component has been unused for since said component was immediately previously used is equal to or larger than a predetermined value or not, if in the step of determining whether each said component has the operational status satisfying the first predetermined condition it is determined that said component satisfies said first predetermined condition, then stopping supplying power to said component satisfying said first predetermined condition, determining whether said plurality of components have a power supply status satisfying a second predetermined condition, wherein said second predetermined condition is whether how many of said components is/are supplied with power is equal to or smaller than a predetermined value or not, if in the step of determining whether said plurality of components have the power supply status satisfying the second predetermined condition it is determined that said second predetermined condition is satisfied, then changing said first predetermined condition in content, the step of managing supplying power for each of said function units including the step of setting to a power saving mode said function unit of which components are all unsupplied with power.

22. The non-transitory storage medium according to claim 21, wherein if it is determined that said second predetermined condition is satisfied, then, in the step of changing, said predetermined value of said first predetermined condition is changed to a smaller value.

23. A non-transitory storage medium having stored therein a control program readable by a computer of an image formation apparatus having a plurality of function units, and provided with a plurality of components under power management provided in each said function unit and each supplied with power to implement a corresponding function, said control program causing said computer to perform a process including the steps of:

managing supplying power for each of said function units; and managing supplying power for each of said components for each said function unit, the step of managing supplying power for each of said components for each said function unit including the steps of:

determining whether each said component has an operational status satisfying a first predetermined condition, wherein said first predetermined condition is whether how long period of time said component has been unused for since said component was immediately previously used is equal to or larger than a predetermined value or not, if in the step of determining whether each said component has the operational status satisfying the first predetermined condition it is determined that said component satisfies said first predetermined condition, then stopping supplying power to said component satisfying said first predetermined condition, determining whether said plurality of components have a power supply status satisfying a second predetermined condition, wherein said second predetermined condition is whether that/those of said components which is/are supplied with power consumes/together consume a total of power equal to or smaller than a predetermined value or not, if in the step of determining whether said plurality of components have the power supply status satisfying the second predetermined condition it is determined that said second predetermined condition is satisfied, then changing said first predetermined condition in content, the step of managing supplying power for each of said function units including the step of setting to a power saving mode said function unit of which components are all unsupplied with power.

24. The non-transitory storage medium according to claim 23, wherein if it is determined that said second predetermined condition is satisfied, then, in the step of changing, said predetermined value of said first predetermined condition is changed to a smaller value.

\* \* \* \* \*

UNITED STATES PATENT AND TRADEMARK OFFICE
CERTIFICATE OF CORRECTION

| | | |
|---|---|---|
| PATENT NO. | : 8,547,567 B2 | Page 1 of 1 |
| APPLICATION NO. | : 13/008677 | |
| DATED | : October 1, 2013 | |
| INVENTOR(S) | : Kenji Manabe | |

It is certified that error appears in the above-identified patent and that said Letters Patent is hereby corrected as shown below:

In the Claims:

Column 32, claim 16, line 24, replace "claim 1" with --claim 15--

Signed and Sealed this
Twenty-fifth Day of March, 2014

Michelle K. Lee
*Deputy Director of the United States Patent and Trademark Office*